(12) United States Patent
Hidesawa et al.

(10) Patent No.: US 6,999,578 B2
(45) Date of Patent: Feb. 14, 2006

(54) TELEPHONE SUPPORT METHOD, STORAGE MEDIUM AND APPARATUS

(75) Inventors: Shigeru Hidesawa, Kawasaki (JP); Junichi Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 10/786,141

(22) Filed: Feb. 26, 2004

(65) Prior Publication Data

US 2005/0047576 A1    Mar. 3, 2005

(30) Foreign Application Priority Data

Aug. 25, 2003 (JP) .............................. 2003-299566

(51) Int. Cl.
*H04M 3/00* (2006.01)
(52) U.S. Cl. ............................... 379/265.1; 379/266.03
(58) Field of Classification Search ...................... None
See application file for complete search history.

(56) References Cited

U.S. PATENT DOCUMENTS 6,711,254 B1 *    3/2004    Sato et al. .............. 379/265.02

FOREIGN PATENT DOCUMENTS

JP    2001-195497    7/2001
JP    2001-338095    12/2001

* cited by examiner

*Primary Examiner*—Creighton Smith
(74) *Attorney, Agent, or Firm*—Staas & Halsey LLP

(57) ABSTRACT

A support reception unit issues a reception number in response to an application for support from a client and notifies the client of the reception number and a guidance for a call connection. A wait state management unit allocates into a queue the reception number sent from a call connection by telephone, holds the call connection and notifies the client, for display, of a current wait state and wait time points increased as a wait time elapses, until a support client becomes available for response. When the support client has become available for response, a support start unit confirms start of support for the client and, as a result of a confirmation response, connects by an extension the held call connection to the support client. A support end unit adds the wait time points to be accumulated and stores them at the point of time when the call connection with the supporter is terminated.

19 Claims, 44 Drawing Sheets

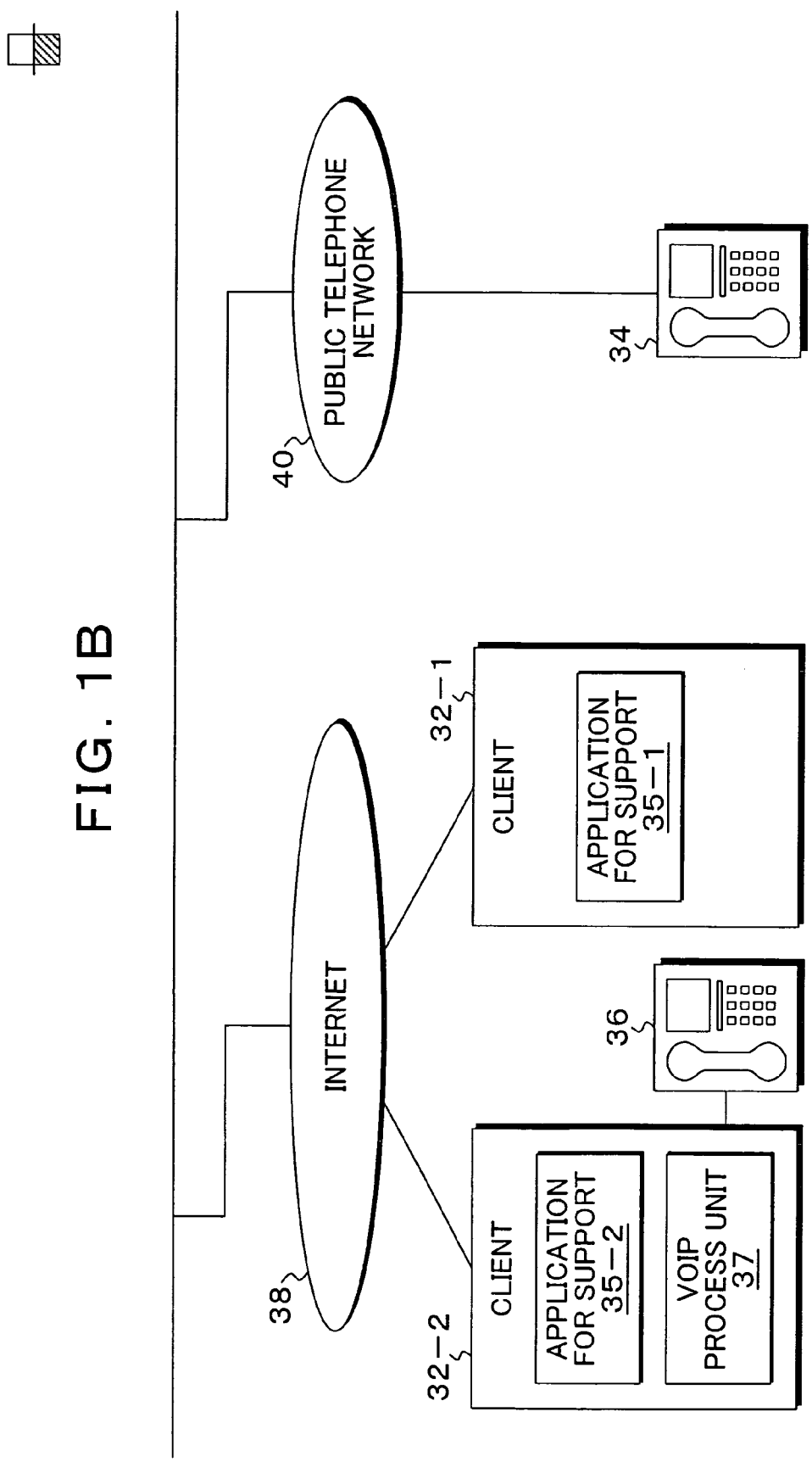

| USER ID | TELEPHONE NUMBER | NAME | ZIP CODE | ADDRESS | BIRTH DATE | GENDER | ACCUMULATED WAITING POINT | OTHERS |
|---|---|---|---|---|---|---|---|---|
| aaaaaaa | aa-aaa-aaaa | aaaa | aaa-aaaa | aaaaaa | aa.aa.aa | x | xx | |
| bbbbbbb | bb-bbb-bbbb | bbbb | bbb-bbbb | bbbbbb | bb.bb.bb | y | xx | |
| ccccccc | cc-ccc-cccc | cccc | ccc-cccc | cccccc | cc.cc.cc | x | xx | |
| | | | | | | | | |
| | | | | | | | | |
| | | | | | | | | |

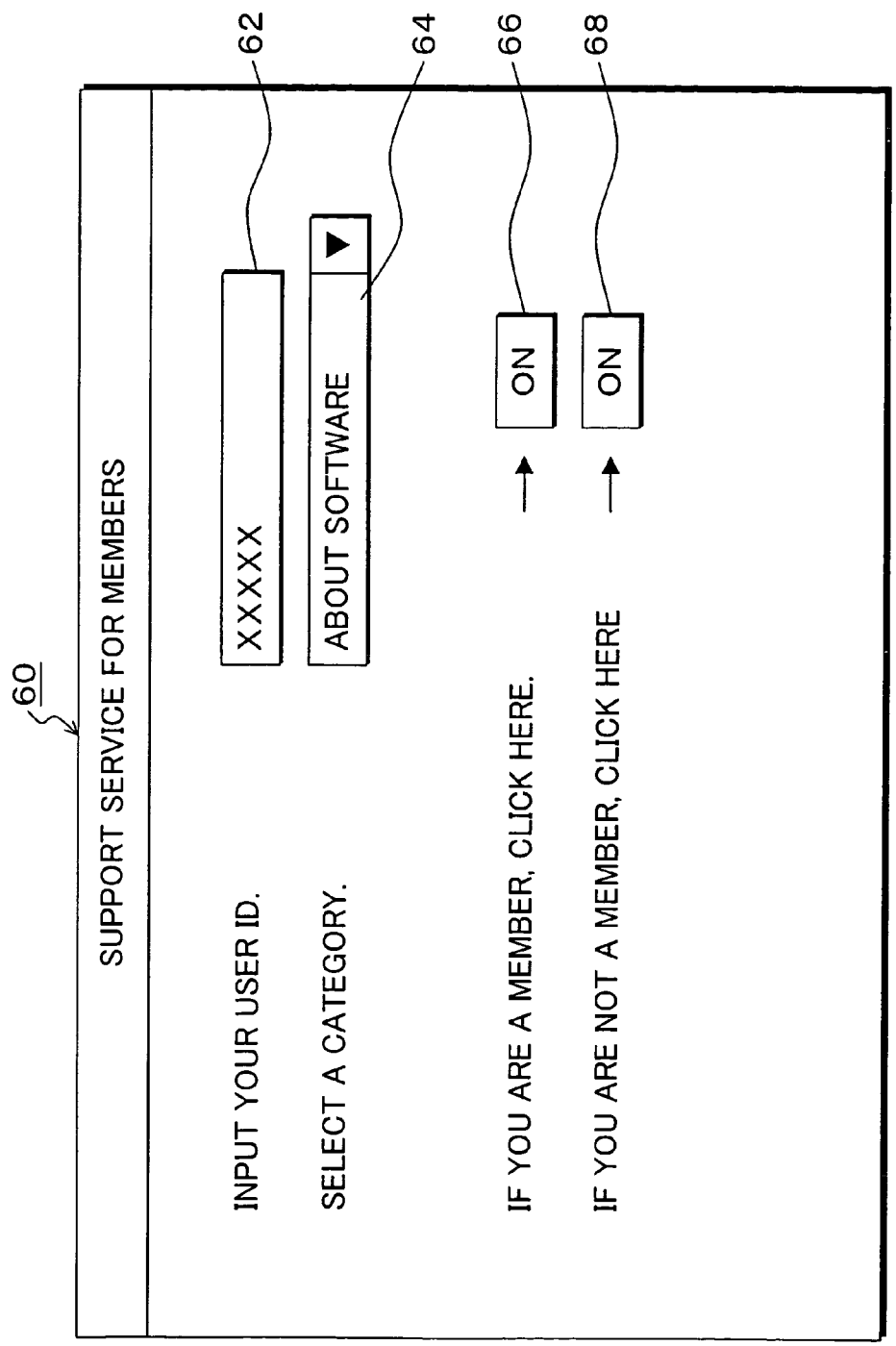

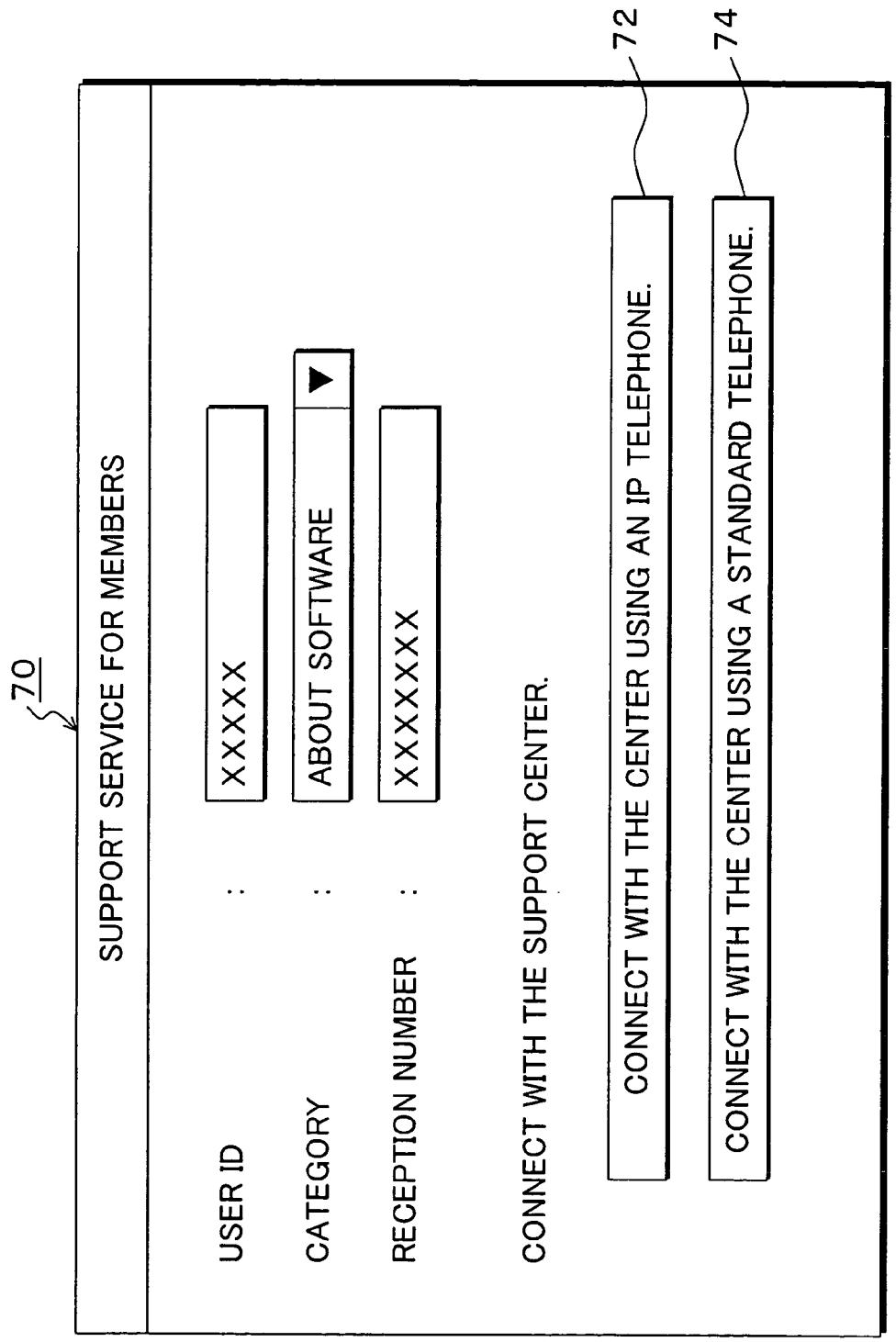

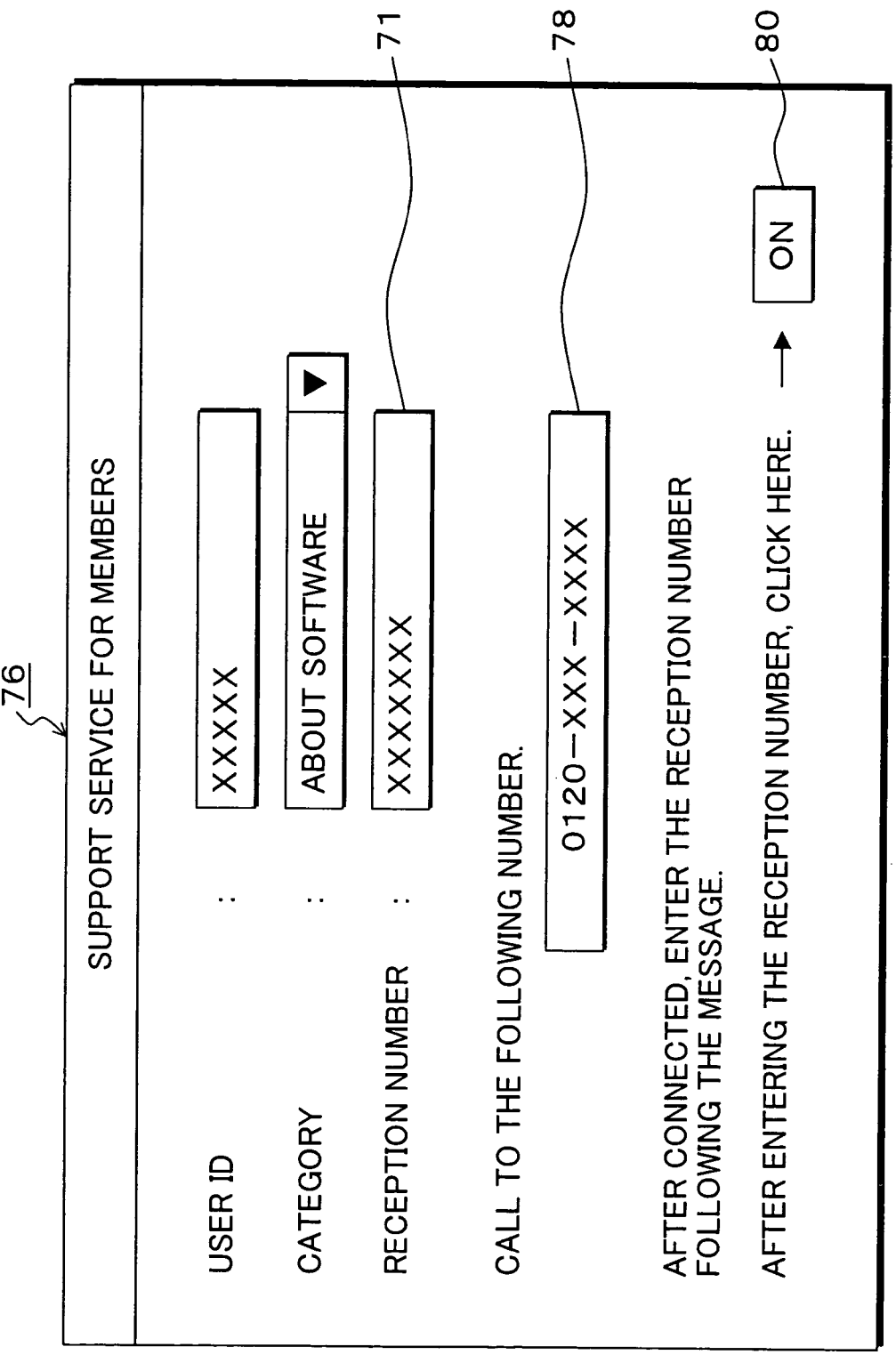

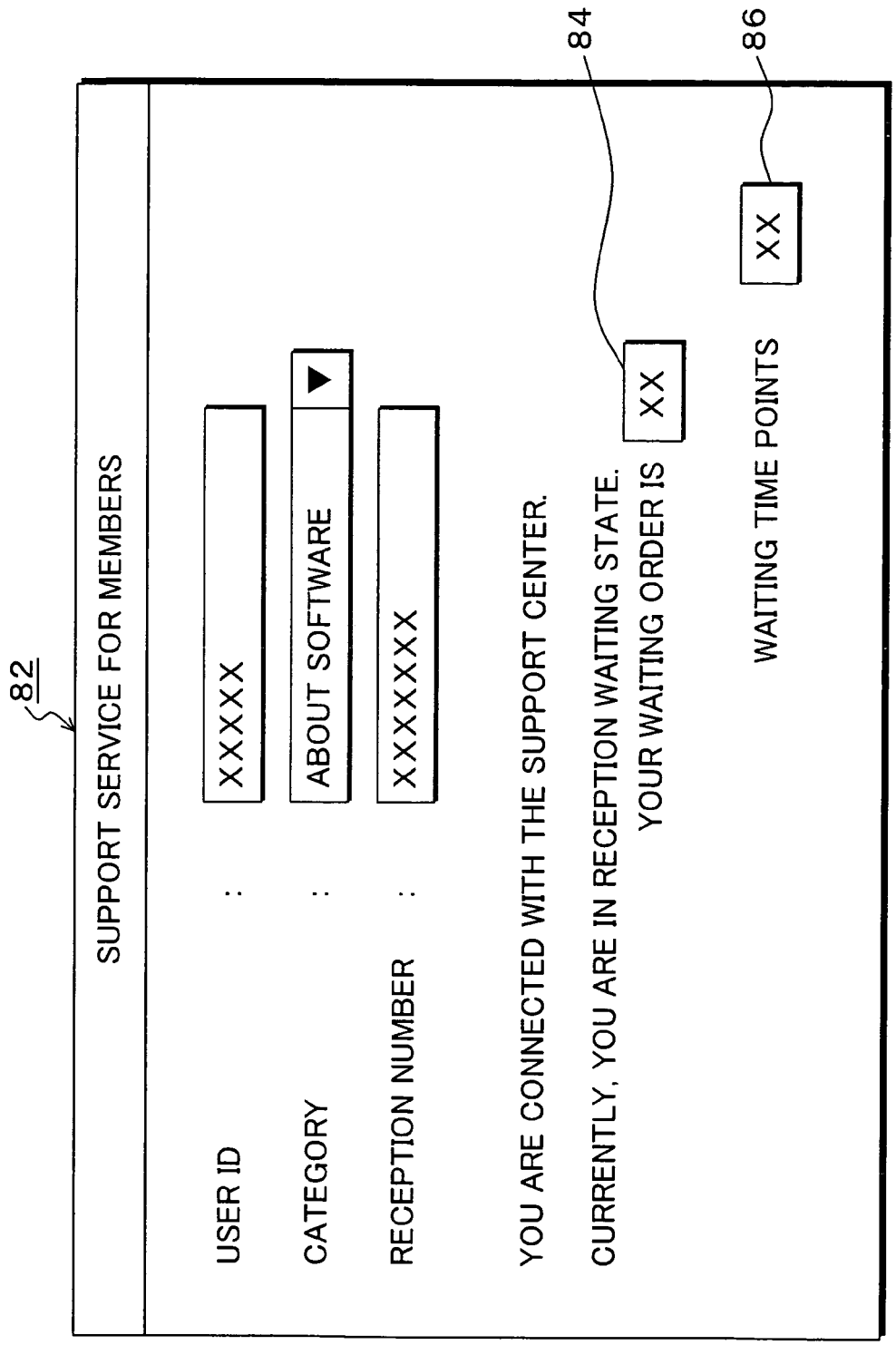

FIG. 17

SUPPORT SERVICE FOR MEMBERS

USER ID : xxxxx

CATEGORY : ABOUT SOFTWARE ▶

RECEPTION NUMBER : xxxxxx

AVAILABLE SUPPORTERS ARE AS FOLLOWS.
THE CLICKED SUPPORTER WILL START TO RESPOND.

| NAME | YEARS OF EXPERIENCE | COMMENT FROM THE SUPPORTER |
|---|---|---|
| ○○○○ | THREE YEARS | MAKE IT EASILY UNDERSTANDABLE TO BEGINNERS. |
| ○○○ | FIVE YEARS | FAMILIAR WITH BIOS-RELATED SUBJECTS. |
| ○○○ | FIVE YEARS | INTRODUCE RECOMMENDED HARDWARE. |

120, 122, 124-1, 124-2, 124-3, 126-1, 126-2, 126-3

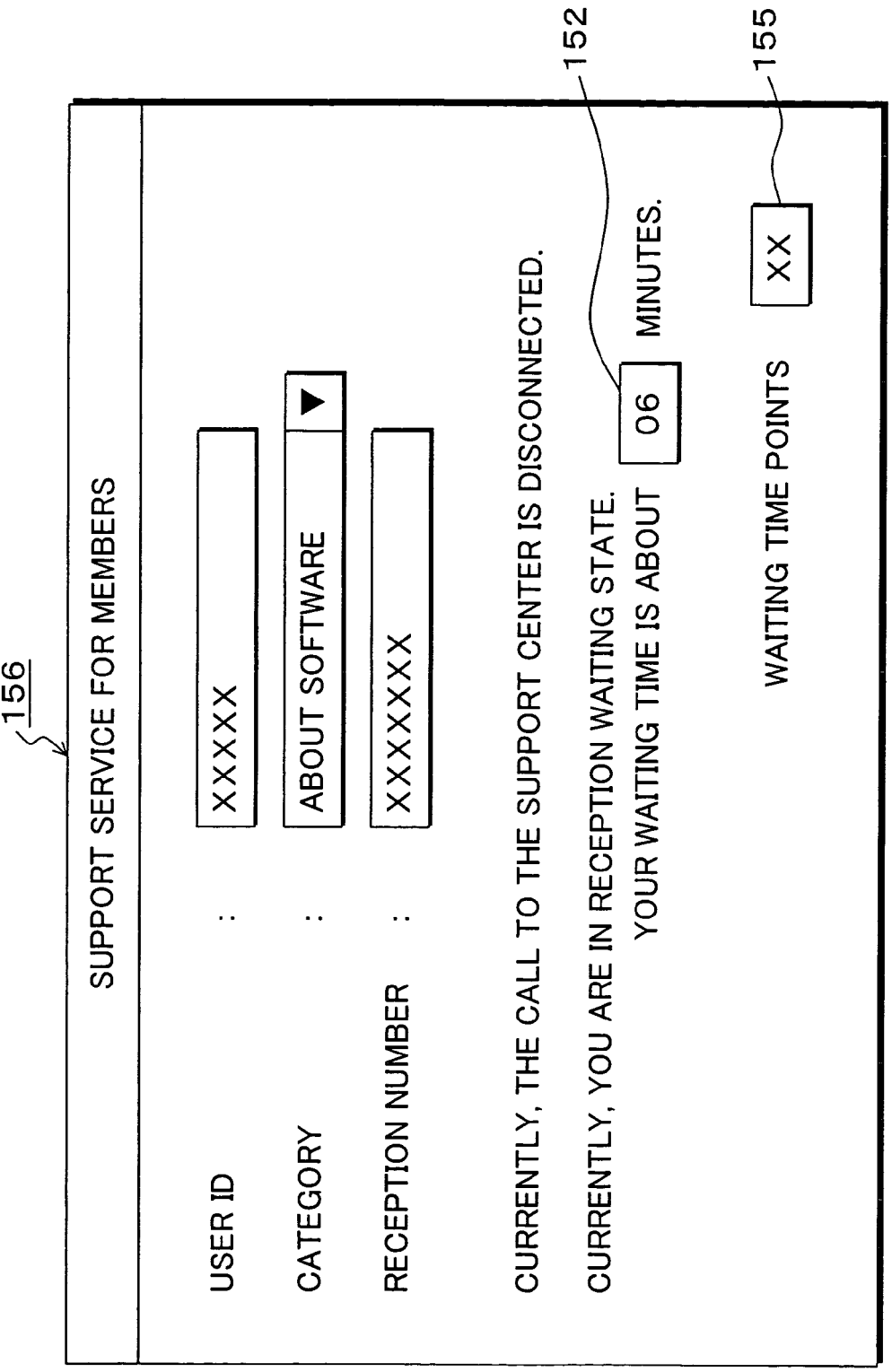

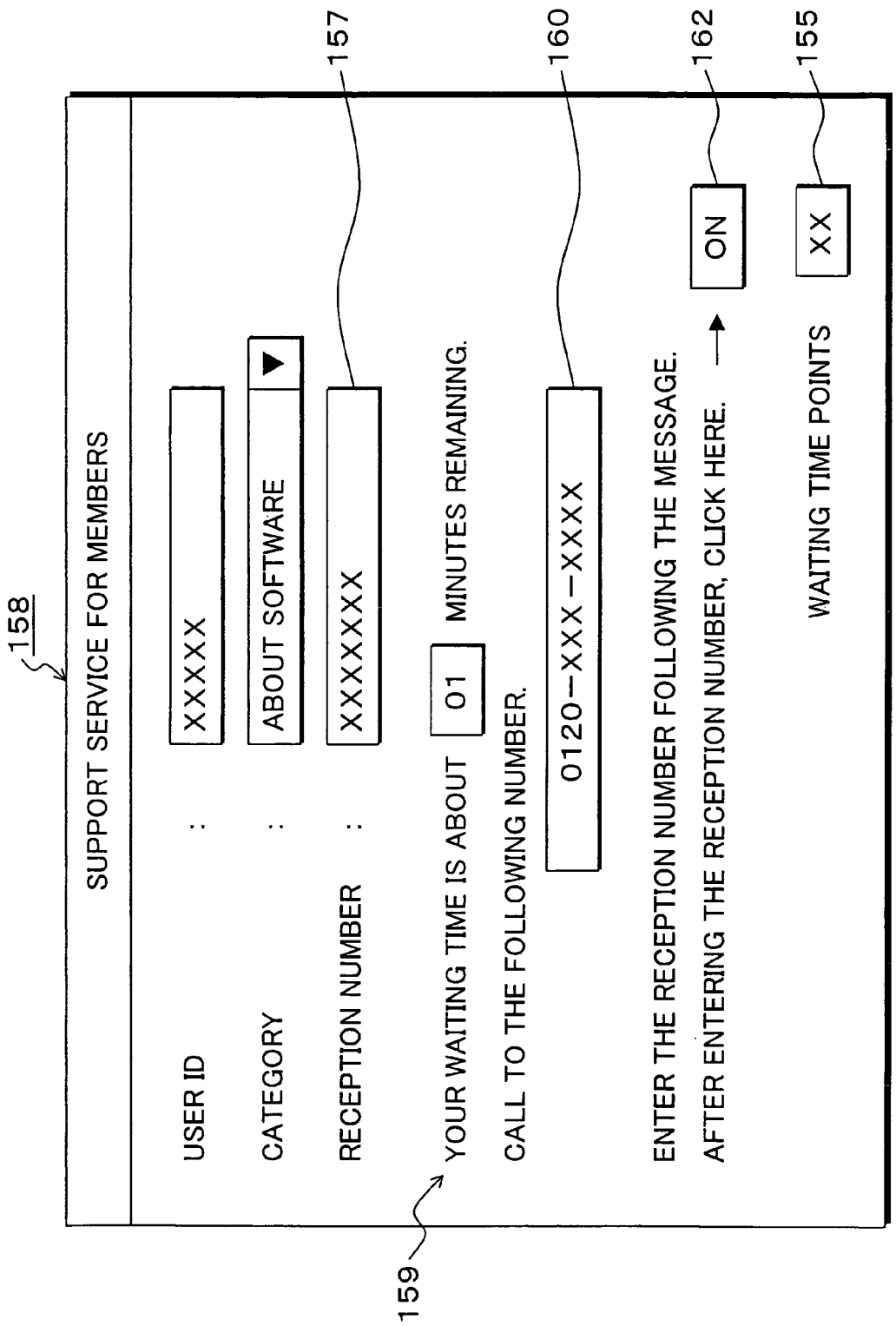

FIG. 25

SUPPORT SERVICE FOR MEMBERS

USER ID : xxxxx

CATEGORY : ABOUT SOFTWARE ▶

RECEPTION NUMBER : xxxxxxx

AVAILABLE SUPPORTERS ARE AS FOLLOWS.
THE CLICKED SUPPORTER WILL START TO RESPOND.

| NAME | YEARS OF EXPERIENCE | COMMENT FROM THE SUPPORTER |
|------|---------------------|----------------------------|
| ○○○○ | THREE YEARS | MAKE IT EASILY UNDERSTANDABLE TO BEGINNERS. |
| ○○○ | FIVE YEARS | FAMILIAR WITH BIOS-RELATED SUBJECTS. |
| ○○○ | FIVE YEARS | INTRODUCE RECOMMENDED HARDWARE. |

164

166

168-1, 168-2, 168-3

170-1, 170-2, 170-3

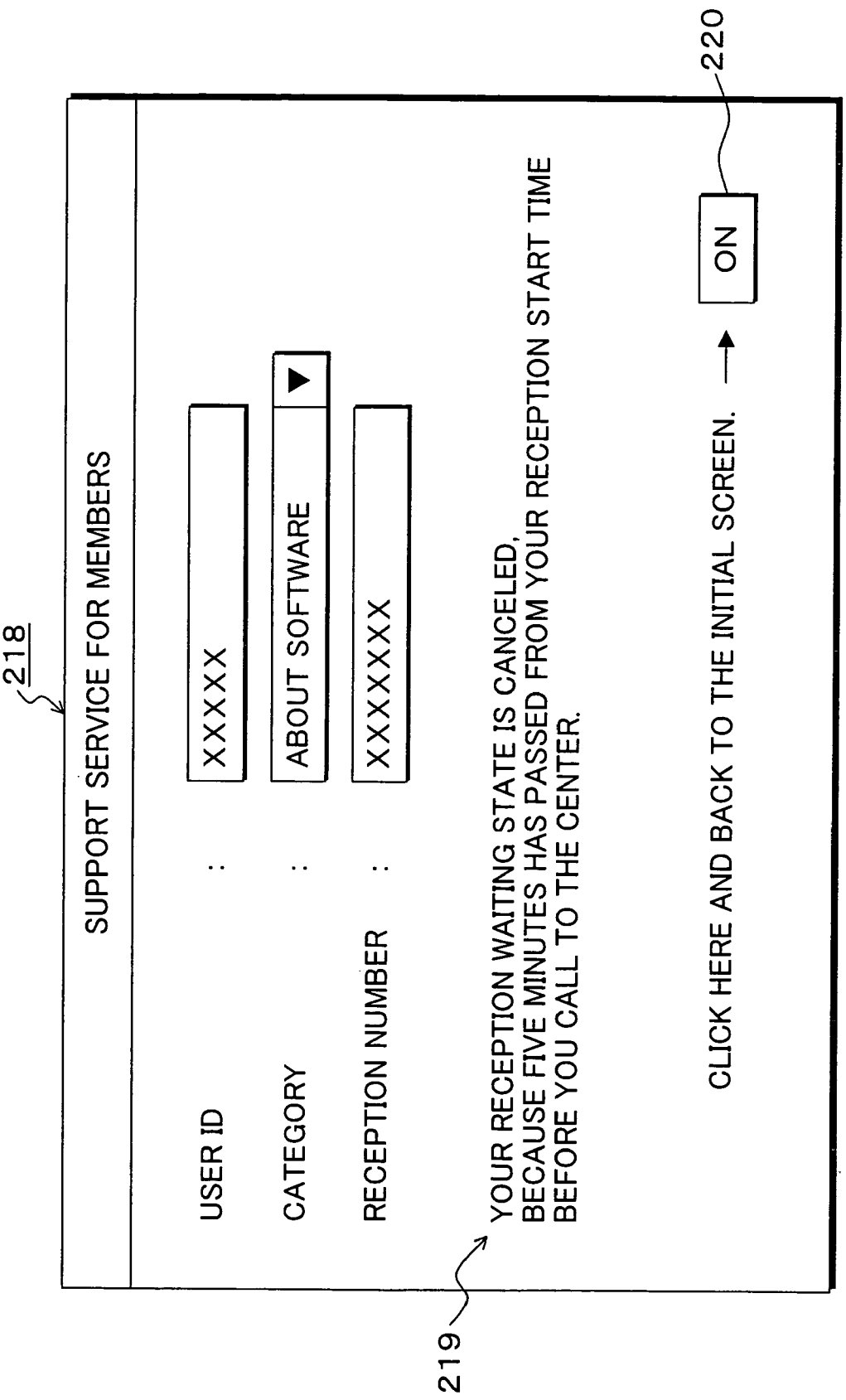

TELEPHONE SUPPORT METHOD, STORAGE MEDIUM AND APPARATUS

BACKGROUND OF THE INVENTION

1. Field of the Invention

The present invention relates generally to a personal computer apparatus, and more particularly to a telephone support method, storage medium and apparatus for providing a quality support service by tying up a support client with a telephone.

2. Description of the Related Arts

Traditionally, manufacturers of personal computers set up support centers for the registered users and counsel about various subjects on the telephone. In these support centers, by hearing current symptoms and information of software installed in the personal computer on the telephone from the personal computer users, solutions for errors and the like are provided. To this end, a large number of past error cases are stored in databases of the support centers, and persons in charge of support hear the environments of software and hardware of the personal computers on the telephone from the users and give answers about relevant solution by finding it from the large number of past error cases. On the other hand, a support system is also utilized such that the users ask the support center questions using such as a web bulletin board function and a mail function of a computer network-and that persons in charge of the support center give answers to the users. (See, e.g., Japanese Patent Application Laid-open Pub. Nos. 2001-338095 and 2001-195497)

However, in such a conventional support system using telephones for inquiry, since the number of inquiries from the users increases drastically, even if a user calls the support center, the call ends up with a reception wait state in most cases, and it takes considerable time to be connected with a person in charge of reception in the center. If this situation is repeated many times, the user as a result has to give up on utilizing the support center, and since user's expectation goes disappointed, a problem is posed that this consequently leads to mistrust about the manufacturer.

Furthermore, since reception in the center is performed by automatic voice responses and responds to the user by voice guidance such as "telephone lines are very busy now, please wait for a while" or "telephone lines are very busy now, please call again after awhile", a user does not know about how long the user has to wait or whether the user will be connected or not when the user calls again after awhile, so it cannot be said that appropriate response is performed in this situation.

SUMMARY OF THE INVENTION

It is therefore the object of the present invention to provide a telephone support method, storage medium and apparatus which have a mechanism that a user inquiring at the support center by telephone can comprehend how long the user has to wait and that the waiting itself brings merit to the user.

The invention provides a telephone support method accommodating inquiries from users by telephone. The telephone support method of the invention is characterized by comprising:

a support reception step, in which a support reception unit issues a reception number in response to an application for support from a user terminal and notifies the user terminal of the reception number and a guidance for a call connection;

a wait state management step, in which a wait state management unit notifies the user terminal of wait information indicating a current wait state and wait time points increased as a wait time elapses until a support terminal becomes available for response;

a support start step, in which a support start unit connects a held call connection to an extension when the support terminal becomes available for response; and a support end step, in which a support end unit adds the wait time points to past wait time points, for storage. It is to be noted that the support terminal is attended by a supporter, and that when the supporter becomes available for response after the call with a user in communication is over, currently held telephone call from another user is connected for talking so that the supporter responds to the user. A plurality of support terminals is provided, and a supporter attends to each of them and responds to a user.

At this point, if a plurality of supporter becomes available for response when the support start unit 56 confirms start of support to a client, supporter selection information is notified, and the held call connection is connected by extension to a support client of the supporter specified by a selection response from the user.

The supporter selection information sent to the users in order to start support includes names of supporters, years of experience, comments and others such that the users can select an appropriate supporter for subject they want to inquire.

Herein, the support reception step may include verifying whether the user is a registered member or not by searching a member database with user information from the application for support; and if the user is a registered member, issuing a reception number and notifying the user of the reception number and a guidance for a call connection, and, if the user is not a registered member, notifying the user of a guide to admission.

The support reception step may include notifying, as the guidance for the call connection, the user terminal of a telephone number for the standard telephone and an IP address for an IP telephone of a support site.

The wait state management step may include notifying the user terminal of a current wait order or of a wait time that remains before the start of support.

The support start step may include, when the support terminal becomes available for response, sending selection information on a plurality of support terminals to the user terminal and connecting to an extension the call connection held at a support site specified by a selection response from the user terminal.

The support start step may include, when the support terminal becomes available for response, sending to the user terminal, for selection, selection information including names, years of experience and comments of supporters at a plurality of supporter terminals.

The telephone support method according to the present invention provides a telephone support method allowing reconnection to be effected after disconnecting the phone in a wait stage. This telephone support method is characterized by adding to the above telephone support method a reconnection management step, when the call connection with the user terminal held in a wait state is disconnected, continuing to notify the user terminal, for display, of wait information indicating the current wait state and wait time points increased as the wait time elapses, and requesting the user terminal to make a call reconnection at the timing immediately before start of support.

Herein, the reconnection management step may include, when a call reconnection by telephone is not yet made at the support start time after requesting the user terminal to make the call reconnection, canceling the wait state when the elapsed time from the support start time exceeds a predefined time period.

The present invention provides a computer-readable storage medium which store a program allowing a computer to execute:

a support reception step issuing a reception number in response to an application for support from a user terminal and notifying the user terminal of the reception number and a guidance for a call connection;

a wait state management step notifying the user terminal of wait information indicating a current wait state and of wait time points increased as a wait time elapses until a support terminal becomes available for response;

a support start step connecting to an extension a call connection held at the support terminal when the support terminal becomes available for response; and a support end step adding the wait time points to past wait time points and storing the sum.

The program of the present invention is characterized by adding to the above program a reconnection management step, when the call connection with the user terminal held in a wait state is disconnected, continuing to notify the user terminal, for display, of wait information indicating the current wait state and wait time points increased as the wait time elapses, and requesting the user terminal to make a call reconnection at the timing immediately before start of support.

The present invention provides a telephone support apparatus disposed in the form of a server at the support center. The telephone support apparatus comprises a support reception unit issuing a reception number in response to an application for support from a user terminal and notifying the user terminal of the reception number and a guidance for a call connection; a wait state management unit notifying the user terminal of wait information indicating a current wait state and of wait time points increased as a wait time elapses until a support terminal becomes available for response; a support start unit connecting to an extension a call connection held at the support terminal when the support terminal becomes available for response; and a support end unit adding the wait time points to past wait time points and storing the sum.

The support apparatus of the present invention is characterized by adding to the above apparatus a reconnection management unit, when the call connection with the user terminal held in a wait state is disconnected, continuing to notify the user terminal, for display, of wait information indicating the current wait state and wait time points increased as the wait time elapses, and requesting the user terminal to make a call reconnection at the timing immediately before start of support.

The details of the medium and telephone support apparatus are substantially the same as those of the telephone support method of the invention.

According to the invention, when a registered user calls to a support center to inquire, first, the user activates a client function of a user terminal and obtains a reception number by applying for support to the center, and after that, by calling to the center and sending the reception number with push buttons and the like, a wait time or order until support starts is displayed on the client, and the users easily understand how long they has to wait or that they should call again.

Also, wait time points increased according to the wait time are displayed on a stand-by screen, and there is a merit that user can get points by waiting, so it is possible to alleviate the impressions to the users, such as a wait time is wasted time.

Further, when the user calls to the support center, once the reception number is registered in a queue, the wait state is maintained if the user hang up the phone, and for example, the user is instructed on the client to call to the center one (1) minute before start of support, therefore, if the user calls again at this point, the user can be supported almost without waiting.

Especially, if the wait time is long, such as thirty minutes of one (1) hour, the users may wait by doing another thing until the remaining time on the stand-by screen comes to an end, and long wait time does not bother the user.

The above and other objects, aspects, features and advantages of the present invention will become more apparent from the following detailed description when taken in conjunction with the accompanying drawings.

BRIEF DESCRIPTION OF THE DRAWINGS

FIGS. 1A and 1B are explanatory diagrams of a system configuration of the invention;

FIG. 6 is an explanatory diagram of an application for support screen;

FIG. 7 is an explanatory diagram of a call selection screen when a standard telephone is selected to the server of FIG. 2;

FIG. 8 is an explanatory diagram of a calling screen for calling a standard telephone to the server of FIG. 2;

FIG. 9 is an explanatory diagram of a stand-by screen displayed by a call connection to the server of FIG. 2 until start of support;

FIG. 17 is an explanatory diagram of a support start screen for selecting a person-in-charge-of-support from the server of FIG. 2;

FIG. 23 is an explanatory diagram of a reconnection stand-by screen displayed until start of support in the case that call connection to the server of FIG. 18 has been disconnected;

FIG. 24 is an explanatory diagram of a reconnection stand-by screen displayed when one (1) minute remains to start support;

FIG. 25 is an explanatory diagram of a support start screen for selecting a person-in-charge-of-support from the server of FIG. 18;

FIG. 37 is an explanatory diagram of a cancel screen in the case that five (5) minutes has passed from the start of support in the server of FIG. 18.

DESCRIPTION OF THE PREFERRED EMBODIMENTS

Figure 1A:
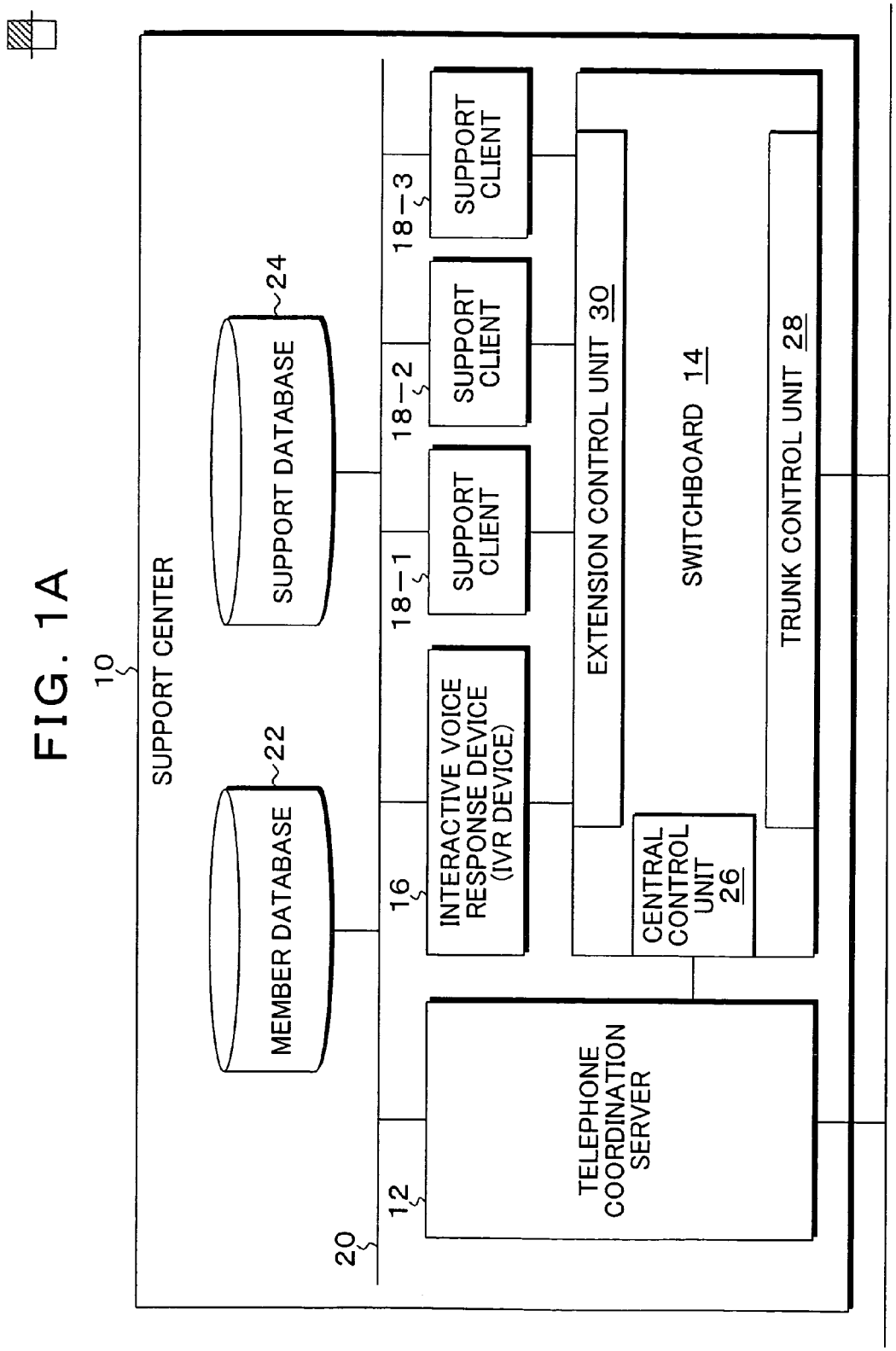

FIGS. 1A and 1B are explanatory diagrams of a system configuration of a telephone support process according to the invention. In FIGS. 1A and 1B, a support center 10 is a facility to be a core of the telephone support process and is provided with a telephone coordination server 12, a switchboard 14, a plurality of support client (support terminal) 18-1, 18-2 and 18-3 of a interactive voice response device 16, LAN 20, a member database 22 and a support database 24. The switchboard 14 provided to the support center 10 is provided with a central control unit 26, a trunk control unit 28 and an extension control unit 30. When the trunk control unit 28 detects an incoming call from a standard telephone 34 connected via a public telephone network 40 and obtains caller number information, it passes this caller number information to the central control unit 26. The central control unit 26 notifies information including the incoming trunk number and the caller number to the telephone coordination server 12. The extension control unit 30 calls the interactive voice response device 16 based on the connection instruction of the telephone coordination server 12, and the interactive voice response device 16 executes a receiving operation in response to this call, establishes a telephone call path with the standard telephone 34 via the public telephone network 40 and performs the interactive voice response. The telephone coordination server 12 provided to the support center 10 is connected with clients 32-1 and 32-2 via the internet 38. In this embodiment, the client 32-1 requests support to the support center 10 in coordination with the standard telephone 34. Contrary to this, the client 32-2 receives services from the support center 10 in coordination with an IP telephone (Internet Protocol telephone) 36 via the internet. In clients 32-1 and 32-2, applications for support 35-1 and 35-2 are installed in advance in order to perform exchanges needed for support. These applications for support 35-1 and 35-2 may be preinstalled when a user purchases computers which constitutes client 32-1 and 32-2, or the user may download and install the applications for support 35-1 and 35-2 by accessing to the support center 10 after the purchase, or functions of the applications for support 35-1 and 35-2 may be obtained as information of the support center 10 web site browsed by a WWW browser. Since the client 32-2 receives support from the support center 10 using the IP telephone 36, a VoIP process unit 37 is provided to the client 32-2. VoIP stands for Voice over Internet Protocol and has function for transmitting voice using the Internet Protocol.

Figure 2:
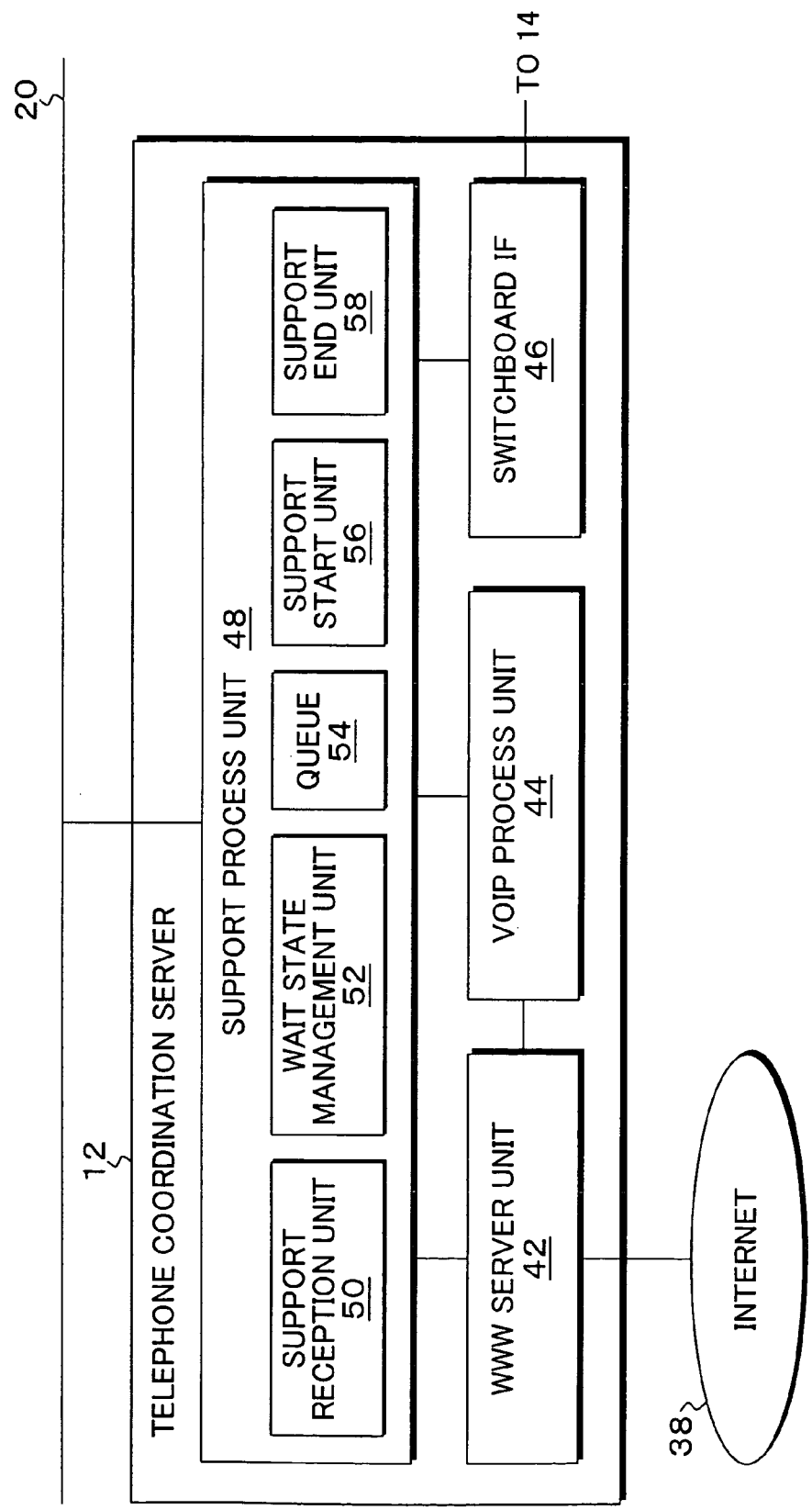
FIG. 2 is a block diagram of a functional configuration of the telephone coordination server in FIGS. 1A and 1B

FIG. 2 is a block diagram of a functional configuration of the telephone coordination server 12 provided to the support center 10 in FIGS. 1A and 1B. In FIG. 2, the telephone coordination server 12, which is known as CTI server, is comprised of a WWW server unit 42, a VoIP process unit 44, a switchboard interface 46 and a support process unit 48. The support process unit 48 is provided with a support reception unit 50, a wait state management unit 52, a queue 54, a support start unit 56 and a support end unit 58 in order to achieve a voice support process according to the invention. The support reception unit 50 issues a reception number to an application for support via the internet 38 from the side of the client 32-1 and 32-2 of FIGS. 1A and 1B and notifies this reception number with guidance for a call connection to the applying client. When the support reception unit 50 receives the application for support, it searches the member database 22 shown in FIGS. 1A and 1B connected via LAN 20 and verifies whether the applicant is a registered member or not, and if the applicant is a registered member, it notifies the reception number and the guidance for a call connection, and on the other hand, if the applicant is not a registered member, it notifies a guide to admission. The wait state management unit 52 registers and allocates the reception number which is sent from the call connection established by the user on the client side who has applied for support and obtained the reception number making a telephone call, holds the call connection and notifies and displays information indicating current wait state and wait time points increased as a wait time elapses to the user of the client who is making the telephone call, until the support clients 18-1 to 18-3 of FIGS. 1A and 1B, which are connected via LAN 20, become available. As the information indicating current wait state to the user of the client, either of followings is notified:

(1) the wait order for start of support; and
(2) the wait time for start of support.

Further, the wait time point, which has "00" as a default value, is a value which is increased by one (1) point every time a certain amount of the wait time, for example one (1) minute, has passed. Therefore, if the time that the user waits for start of support is longer, the acquired wait time points will be increased more. The wait time points are managed on the side of the support center 10 by accumulating for each registered member, and the users can receive various services using the wait time points, such as a privilege service, a price discounting and a product give-away. Since these wait time points are provided to the side of the user who waits for start of support and increase as the wait time elapses, the user can wait for start of support, being less bothered by the wait time. The support start unit 56 confirms start of support to the client when the side of the support clients 18-1 to 18-3 of FIGS. 1A and 1B becomes available for response and, in response to the confirm response from the client, connects the call connection of the user held in the wait state to, for example the support client 18-1, which becomes available for response, by extension to start response to the user. At this point, if a plurality of supporter becomes available for response when the support start unit 56 confirms start of support to a client, supporter selection information is notified, and the held call connection is connected by extension to a support client of the supporter specified by a selection response from the user. The supporter selection information sent to the users in order to start support includes names of supporters, years of experience, comments and others such that the users can select an appropriate supporter for subject they want to inquire. The support end unit 58 executes a point update process in which, at the time when the call connection between the support client and the user is terminated, the wait time points increased according to the wait time for of support is added to the wait time points stored in the member database 22 of 22 and stored. When this update of the wait time point is completed, current cumulative wait time points are notified. For specific details of the telephone support process by the support process unit 48 provided to the telephone coordination server 12, the case that the telephone support is processed in coordination with the standard telephone 34 as in the client 32-1 of FIGS. 1A and 1B and the case that the telephone support is processed using the IP telephone 36 as in the client 32-2 have different process details according to each telephone function, and this is explained in the description below.

Figure 3:
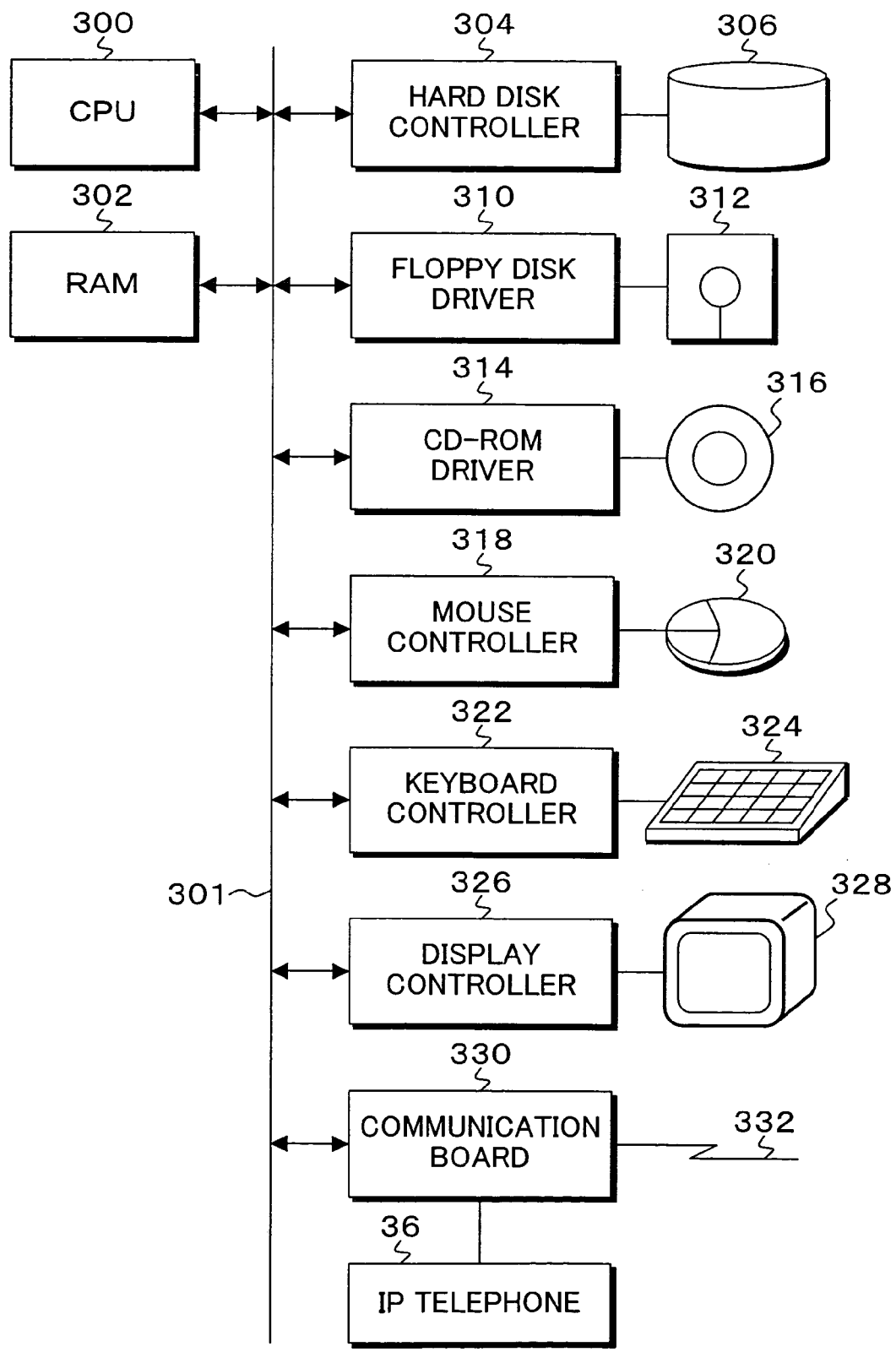
FIG. 3 is an explanatory diagram of a hardware environment of a computer in which the server of FIG. 2 is constructed.

The telephone coordination server 12 in FIG. 2 is achieved by hardware resources of a computer shown in FIG. 3, for example. In the computer of FIG. 3, a bus 301 of CPU 300 is connected with RAM 302, a hard disk controller (software) 304, a floppy disk driver (software) 310, a CD-ROM driver (software) 314, a mouse controller 318, a keyboard controller 322, a display controller 326 and a communication board 330. The hard disk controller 304 is connected with a hard disk drive 306 and loaded with programs for executing the telephone support process of the invention, and on startup of computer, necessary programs are called from the hard disk drive 306, deployed on RAM 302 and executed by CPU 300. The floppy disk driver 310 is connected with a floppy disk drive (hardware) 312 and can read from and write to a floppy disk (R). The CD-ROM driver 314 is connected with a CD drive (hardware) 316 and can read data and programs stored in CD. The mouse controller 318 transfers input operations with the mouse 320 to CPU 300. The keyboard controller 322 transfers input operations with the keyboard 324 to CPU 300. The display controller 326 performs the display on the display unit 328. The communication board 330 uses a communication line 332 to communicate with apparatuses on the network or external apparatuses on the internet. Also, on the communication board 330, a VoIP modem is embedded to establish a voice communication path with the IP telephone on the client side via the internet. Both of clients 32-1 and 32-2 in FIGS. 1A and 1B is achieved by the same hardware resources of the computer of FIG. 3, and applications for support is loaded in the hard disk drive 306, and on startup of computer, necessary programs are called from the hard disk drive 306, deployed on RAM 302 and executed by CPU 300. Also, on the communication board 330, the IP modem is embedded to establish a voice communication path with the support center via the internet by connecting with the IP telephone 36.

Figure 4:
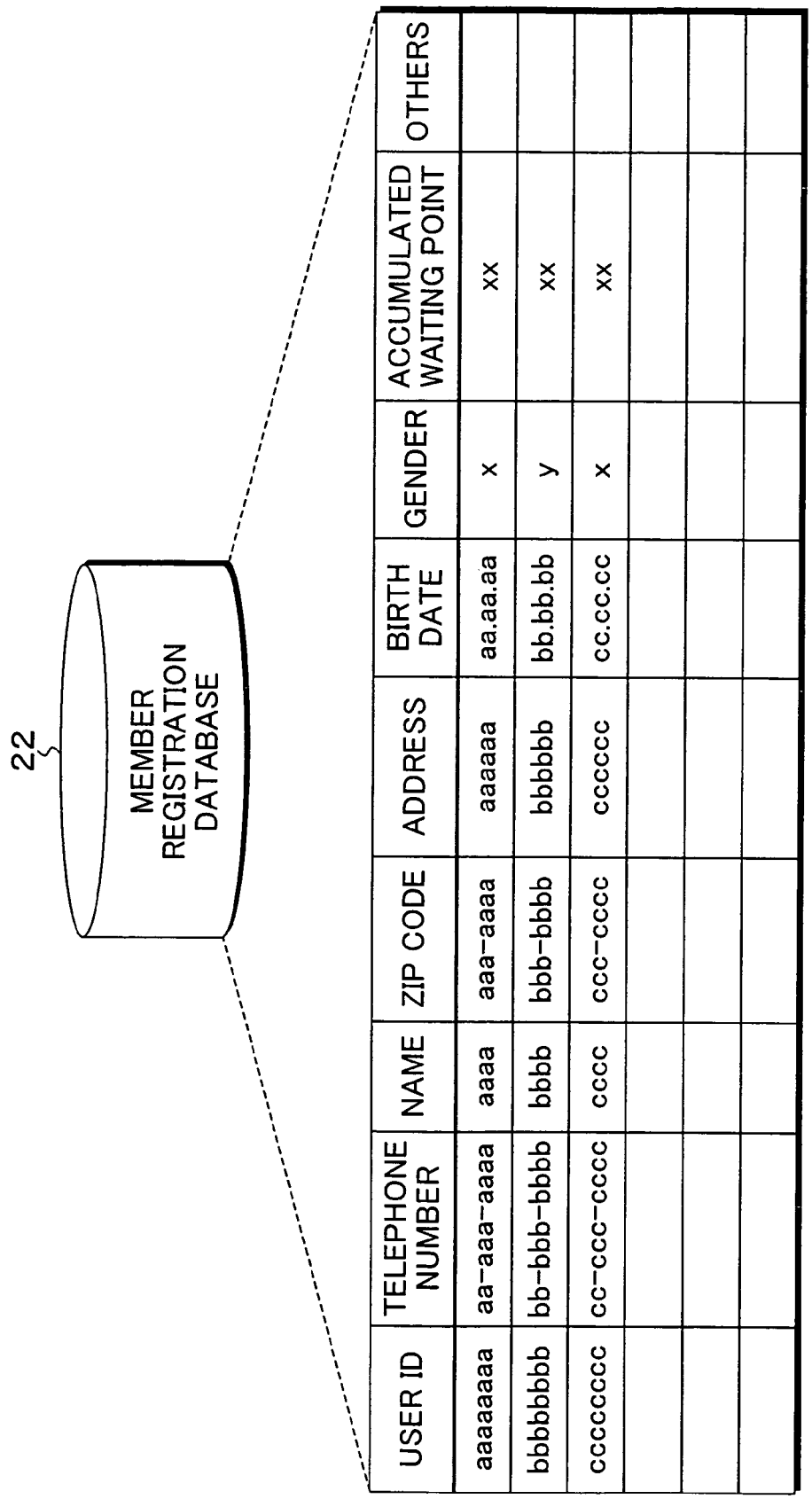
FIG. 4 is an explanatory diagram of a member database in FIGS. 1A and 1B.

FIG. 4 is an explanatory diagram of the member database 22 of FIGS. 1A and 1B. In the member database 22, information about members who registered as a member is registered for each member. This member information includes a user ID, telephone number, Zip code, address, birth date, gender and others and has cumulative wait time points. The member registration to the member database 22 is executed based on the application when the user purchases the computer of the equipment of the manufacturer operating the support center 10 of FIGS. 1A and 1B. Also, after purchasing, the member registration can be handled online when the user applies for the member registration from the client. In addition, in the support database 24 of FIGS. 1A and 1B, various necessary documents for inquiries from the registered users are registered in advance, and, for example, for inquiries about errors from the user, information of error cases including error information, environmental conditions where errors occur and information for handling errors are stored, therefore the supporters taking charge of the support clients 18-1 to 18-3 can search the support database 24, pull up necessary cases and suitably respond to the inquiries from the users. Off course, contents of the support database 24 are appropriately determined depending on available support subjects of the support center 10.

Figure 5A:
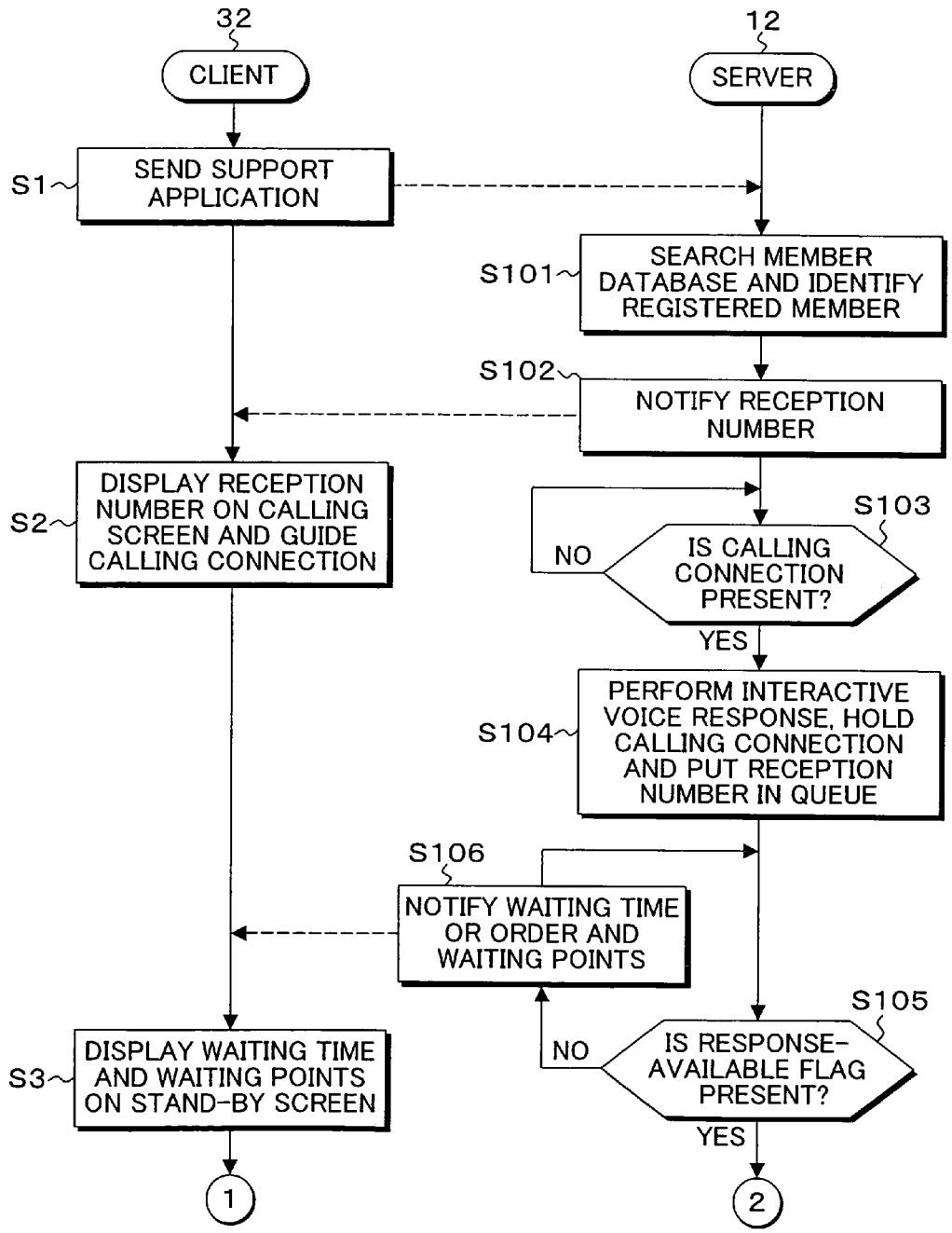
FIGS. 5A and 5B are time charts illustrating processes of a client and a server in the invention.
Figure 5B:
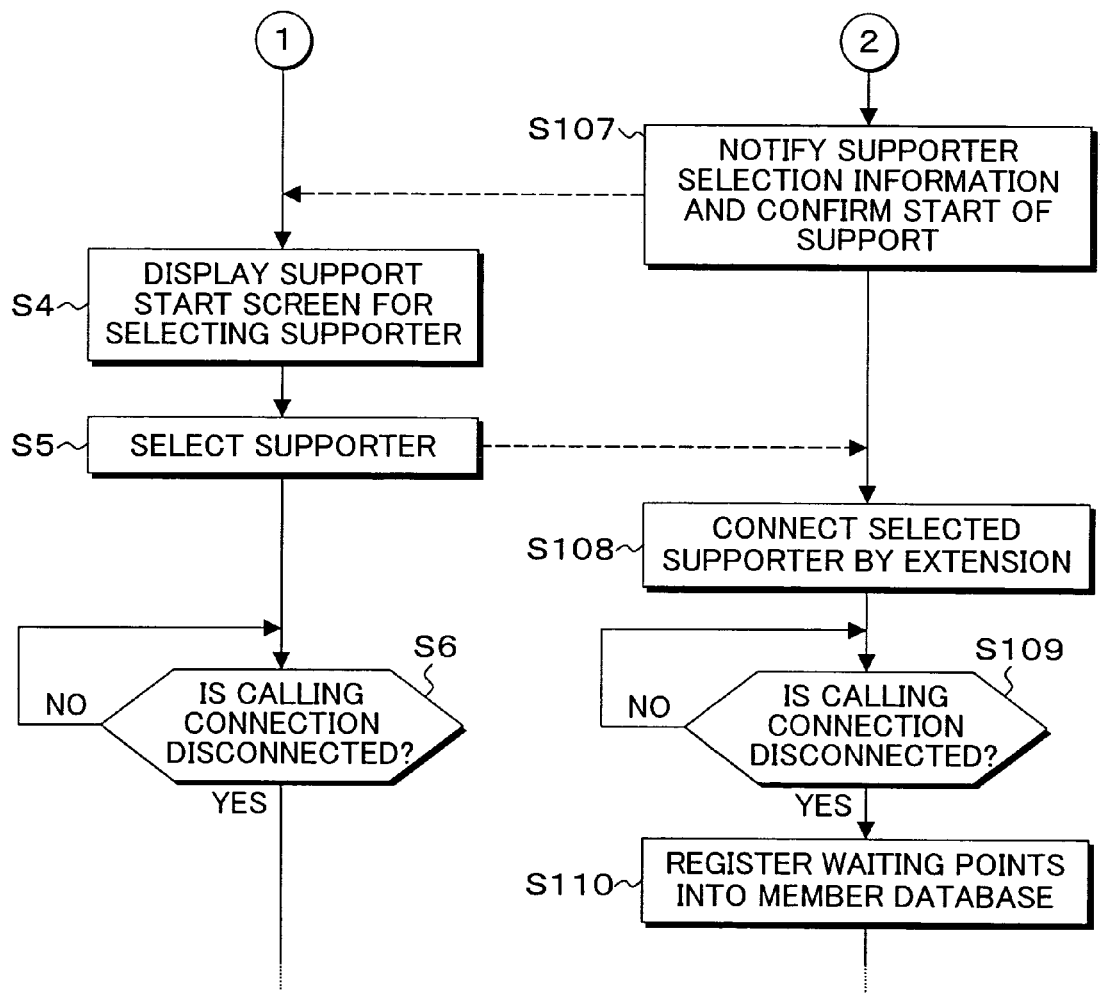

FIGS. 5A and 5B are time charts illustrating processes of a client and a server in the invention, and this is an example of the case when the telephone support for the support center system 10 is performed in coordination with the standard telephone 34, as in the case of the client 32-1 of FIGS. 1A and 1B. In FIGS. 5A and 5B, the client 32 sends an application for support to the telephone coordination server 12 in step S1. At this point, the client 32 uses an application for support screen 60 such as shown in FIG. 6 to send the application to the telephone coordination server 12. The application for support screen 60 has a user ID 62 and a category selection dialogue 64 and is comprised of a click button for members 66 and a non-member button 68. Therefore, when the user activates the application for support in the client 32, opens the application for support screen 60, enters an own user ID in a user ID input field 62, then selects for example "about software" from the categories 64 and, because the user is a registered member, clicks the click button for members 66, the application for support is sent to the server 12. In addition, non-members do not enter the user ID because it is not present, select the category and click the non-member button 68. The telephone coordination server 12, which receives the application for support transmission of step 1 from the client, searches the member database 22 to identify the registered member in step S101, issues a reception number in the case of the registered member and notifies it to the client 32 in step S102. In addition, when it is not the registered member, a guide to admission is sent to the client 32. The client 32, which receives the reception number from the telephone coordination server 12, displays the reception number on the calling screen in step S2, and guidance for the call connection is displayed. For example, a call selection screen 70 such as shown in FIG. 7 is displayed. On this call selection screen 70, an IP telephone selection portion 72 and a standard telephone selection portion 74 are displayed, and, since the standard telephone 34 is used in this example, the standard telephone selection portion 74 is clicked. When the standard telephone is selected in this way, a calling screen 76 such as shown in FIG. 8 is displayed on the client 32. On the calling screen 76, a support center telephone display field 78 is displayed, and in this field, a certain telephone number, which can be received on the center side currently, is displayed. Since the support center 10 has several telephone numbers, as this telephone number in the center telephone display field 78, the telephone number with the currently lowest congestion degree is notified and displayed with the reception number. When the user looks at the center telephone display field 78 of the calling screen 76 and makes a telephone call to that number, the user is connected to the interactive voice response device 16 via the switchboard 14; a telephone call path is established; voice guidance for entering the notified reception number with the push buttons is streamed from the interactive voice response device 16; and the reception number displayed in a reception number display field 71 on the screen is entered by the push buttons according to this voice guidance. After the reception number is entered, a confirm button 80 on the calling screen is clicked. In this way, when the reception number is notified by the user on the side of the client 32 calling the standard telephone, the telephone coordination server 12 identifies the call connection from the standard telephone of the client 32 in step S103, performs interactive voice response for entering the reception number to receive the reception number, confirms that it is the call connection from the user of the client 32 of the reception number notified in step S102, registers and allocates the reception number in the queue 54 in step S104. On the other hand, on the side of the support clients 18-1 to 18-3, when the support client is in a response-available state, a response-available flag is notified to the telephone coordination server 12. For this purpose, the telephone coordination server 12 checks whether the response-available flag from the support clients 18-1 to 18-3 is present or not in step S105, and if the response-available flag is not present, the wait time or order and the wait time points are notified to the side of the client 32 in step S106. At this point, The client 32 displays the wait time or order and the wait time points on the stand-by screen in step S3.

FIG. 9 is the stand-by screen 82 in the client 32, and the current wait order "XX" is displayed in a wait order display field 84. This wait order "XX" is an order in the queue 54 in FIG. 2; the value indicating the order is sequentially reduced when support for preceding reception number is started and that reception number is removed from the queue; and support is started when the wait order is "00". Also, on the stand-by screen, the wait time points "XX" are displayed in a point display field 86. These wait time points are initially "00" and increased by one (1) point, for example, when one (1) minute of the wait time elapses.

Referring to FIGS. 5A and 5B again, if the response-available flag for any of the support clients 18-1 to 18-3 is present in step S105, the telephone coordination server 12 proceed to step S107 and notifies supporter selection information to the client 32 to confirm start of support. In response to this, the client 32 displays a support start screen for selecting a supporter in step S4.

Figure 10:
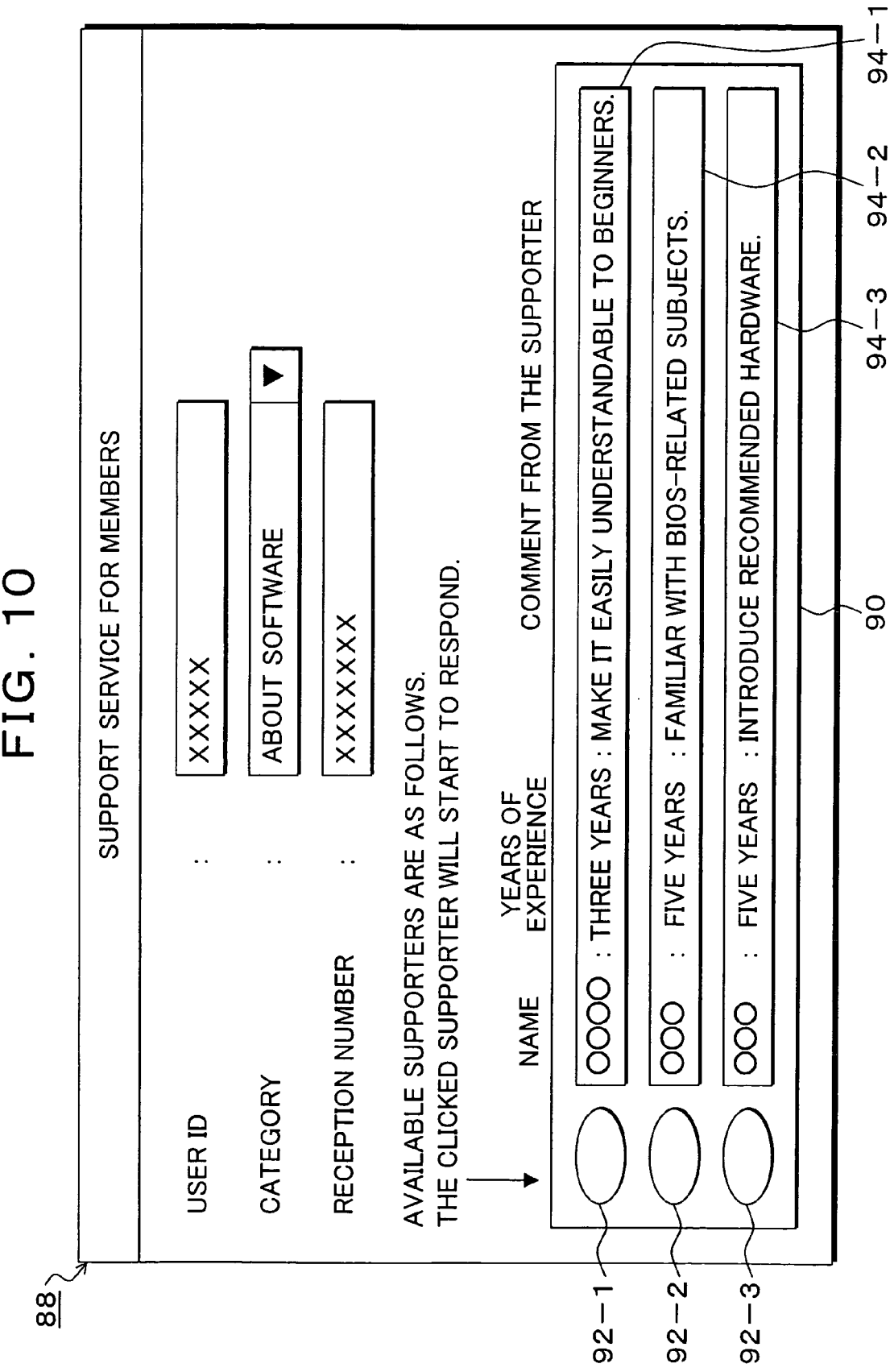
FIG. 10 is an explanatory diagram of a support start screen for selecting a person-in-charge-of-support from the server of FIG. 2.

FIG. 10 is the support start screen 88 displayed on the client 32, and a person-in-charge-of-support selection list 90 is displayed in under part of the screen. In the person-in-charge-of-support selection list 90, selection buttons 92-1 to 92-3 are displayed and followed by supporter information 94-1 to 94-3, and the supporter information 94-1 to 94-3 includes name, years of experience and comment form the supporter. Therefore, the user selects a most appropriate supporter for a own inquiry from the person-in-charge-of-support selection list 90 and clicks any of the supporter selection buttons 92-1 to 92-3.

Referring to FIGS. 5A and 5B again, when the user selects a supporter, the supporter selection information is notified to the telephone coordination server 12 in step S5, and in response to this, the telephone coordination server 12 connects the support client of the selected supporter to the telephone in a call held state by extension in step S108, thereby support by the telephone is started. During the telephone support, the telephone coordination server 12 and the client 32 checks disconnection of the call connection in step S109 and step S6, respectively, and if the disconnection of the call connection is identified, the client 32 terminates a series of processes. On the other hand, the telephone coordination server 12 perform the point update in which the wait time points counted until start of support is added to the past points and registered to the member database.

Figure 11A:
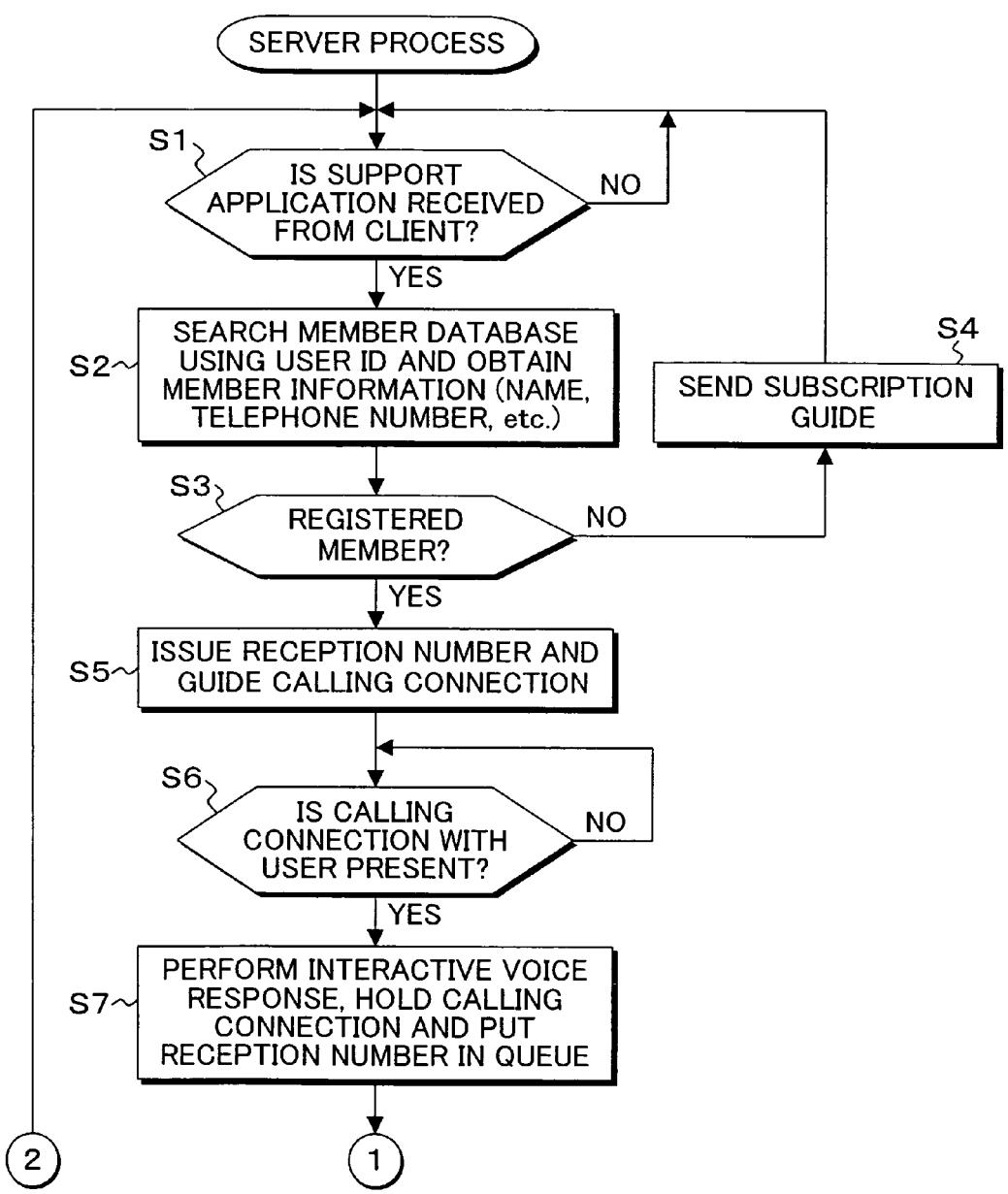
FIGS. 11A and 11B are flowcharts of a server process according to the embodiment of FIG. 2.
Figure 11B:
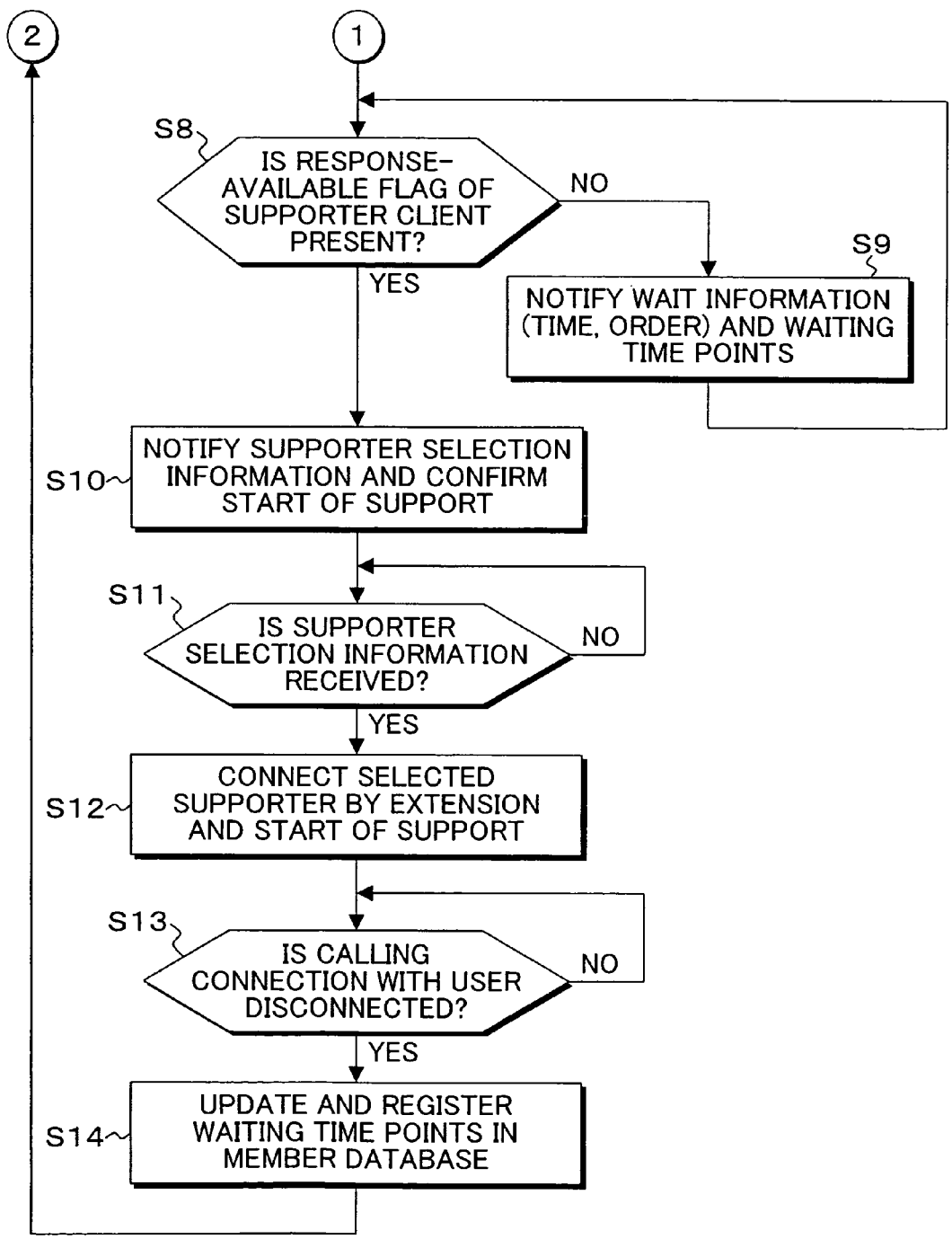

FIGS. 11A and 11B are flowcharts of a server process for the call support according to the embodiment of FIG. 2. This flowchart illustrates contents of the program of the telephone support process in the telephone coordination server 12. This server process is as follows.

Step S1: Whether the reception of the application for support from the client is present or not is checked, and if the reception is present, proceed to step S2.

Step S2: Search the member database 22 by the user ID obtained in application for support from the client to obtain member information such as name, telephone number and others.

Step S3: determine whether it is a registered member or not from the result of the database search, and if it is a registered member, proceed to step S5, otherwise proceed to step S4.

Step S4: This is the case that it is not a registered member, and the guide to admission is sent to the client.

Step S5: Issue the reception number based on the result of the identification of the registered member and notify the guide to the user for urging the call connection to the center.

Step S6: Whether the call connection by telephone from the user of the client side is present or not is monitored, and if the call connection is present, proceed to step S7.

Step S7: Urge input of the reception number on the call connection from the user of the client side by the interactive voice response. Register and allocate the reception number in the queue while holding the call connection.

Step S8: Check whether the response-available flag of the support client is present or not, and if the flag is not present, proceed to step S9, and if the flag is present, proceed to step S10.

Step S9: Notify the wait information such as the wait time and order and the wait time points to the client side to display.

Step S10: This is the case that the response-available flag is obtained, and the information for selecting a supporter who becomes available for response is notified to confirm start of support.

Step S11: Reception of the supporter selection information from the client is checked, and if selection information is received, proceed to step S12.

Step S12: Connect the support client selected by the user with the held telephone call from the user by extension and start support.

Step S13: Disconnection of the call connection with user is identified, and if disconnection is identified, proceed to step S14.

Step S14: Add the wait time points counted until start of support to the past wait time points and perform update registration of the member database 22.

Figure 12A:
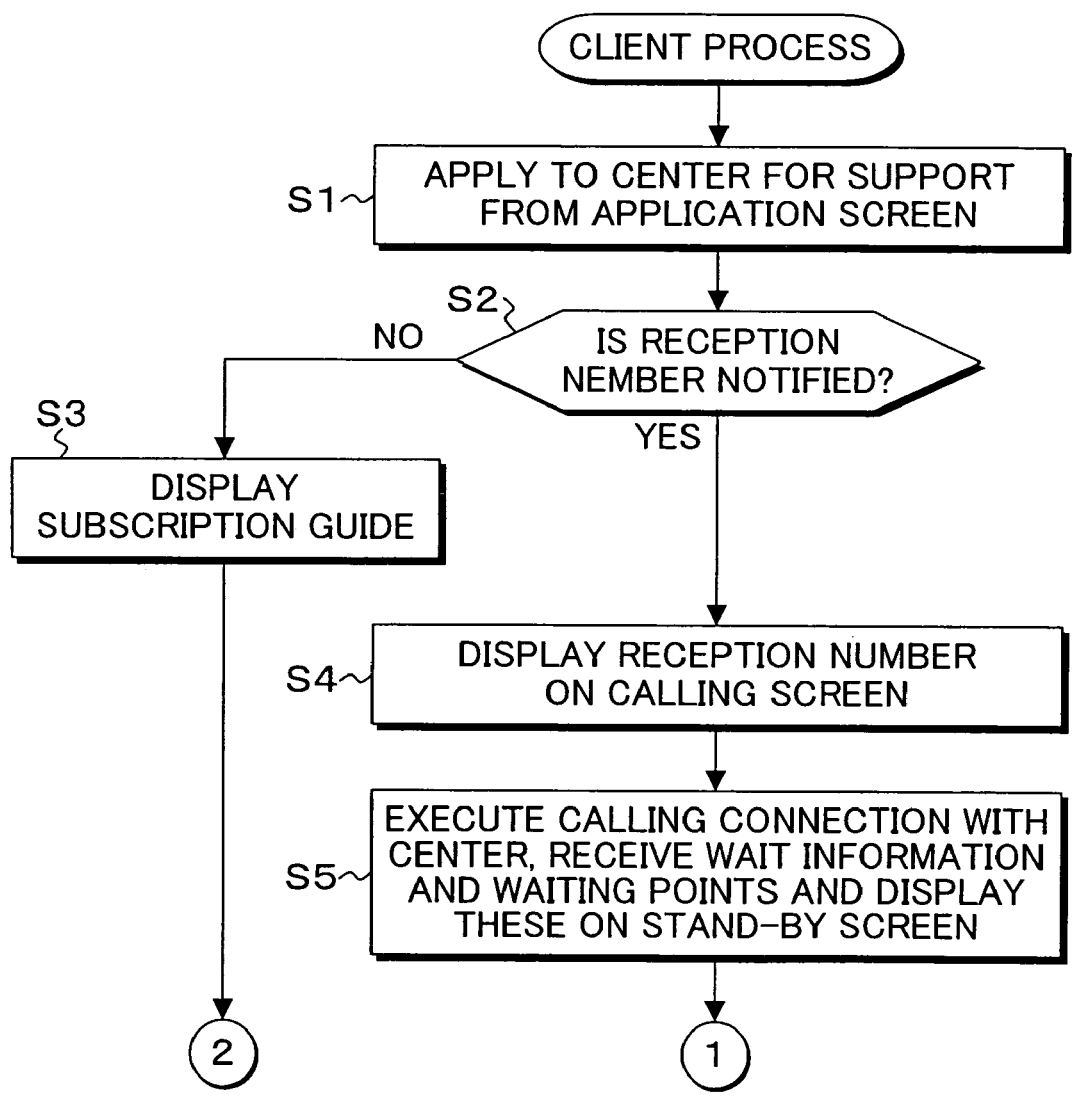
FIGS. 12A and 12B are a flowcharts of a client process corresponding to the server process of FIGS. 11A and 11B.
Figure 12B:
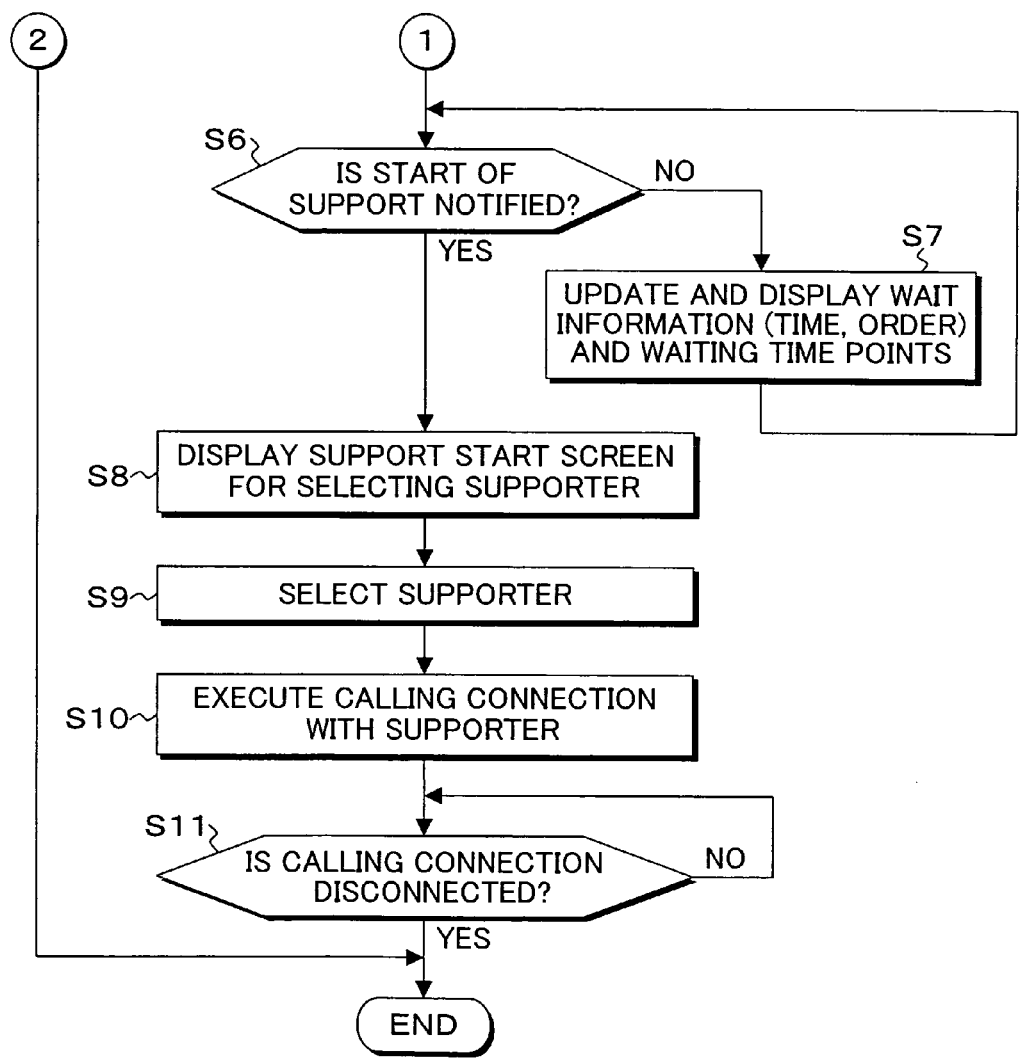

FIGS. 12A and 12B are flowcharts of the user client process corresponding to the server process of FIGS. 11A and 11B and illustrates contents of the program of the applications for support 35-1 and 35-2. This client process is as follows.

Step S1: Apply support to the center from the application for support screen 60 of FIG. 6.

Step S2: Whether the notification of the reception number from the server is present or not is checked, and if the notification is not present, proceed to step S3, if the notification is present, proceed to step S4.

Step S3: Since the guide to admission is sent instead of the notification of the reception number, display the guide to admission and terminate the process.

Step S4: Display the reception number on the calling screen. For example, in the case that the user uses the standard telephone, the call selection screen 70 like FIG. 7 is displayed; the calling screen 76 of FIG. 8 is displayed by clicking the standard telephone selection button 74; a telephone call is made to the telephone number shown in the center telephone number display field 78 on the calling screen; the reception number is entered in the reception number display field 71 according to the voice message; and the confirm button 80 is clicked.

Step S5: Maintain the call connection with the center, receive the wait information and the wait time points and display the stand-by screen 82 like FIG. 9.

Step S6: Wait for the notification of start of support from the server, and if the notification of start is not present, proceed to step S7, and if the notification of start is present, proceed to step S8.

Step S7: Update and display, for example, the wait order and the wait time points on the stand-by screen 80 of FIG. 9.

Step S8: This is the case that the notification of start of support is received, and the support start screen like FIG. 10 is displayed.

Step S9: Select a supporter from the supporter selection list 90 on the support start screen.

Step S10: The call connection with the selected supporter is performed.

Step S11: Disconnection of the call connection with the center is monitored, and if disconnection is identified, terminate the process.

Figure 13:
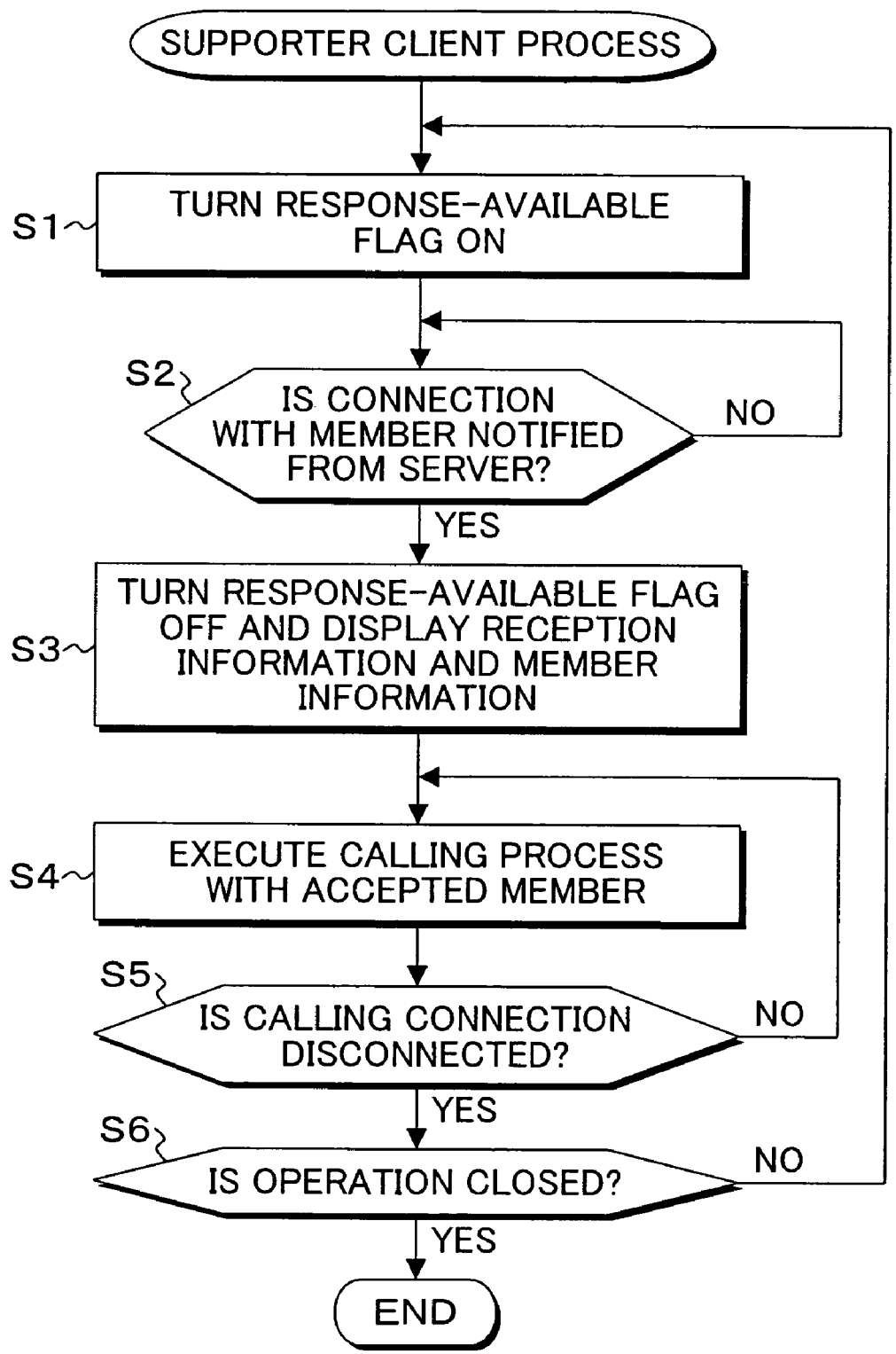
FIG. 13 is a flowchart of a support client process corresponding to the server process of FIGS. 11A and 11B.

FIG. 13 is a flowchart of a support client process in the support clients 18-1 to 18-3 of FIGS. 1A and 1B corresponding to the server process of FIGS. 11A and 11B, and is comprised of following process procedures.

Step S1: In the initial condition immediately after the startup of the support client, turn the response-available flag on for a first.

Step S2: Whether the call connection from the telephone coordination server 12 to the member is checked, and if the call connection is present, proceed to step S3.

Step S3: Turn the response-available flag off and receive and display the reception information and the member information from the telephone coordination server 12.

Step S4: execute a-calling process with the received member.

Step S5: Monitor disconnection of the call connection during the calling process, and if disconnection is detected, proceed to step S6.

Step S6: If the support operation is not ended, back to step S1, and if the operation is ended, terminate a series of processes.

Next, for the case that the telephone support to the support center is performed by using the IP telephone 36 in the client 32-2, an example of the display by the application for support 35-2 in the side of the client is described.

Figure 14:
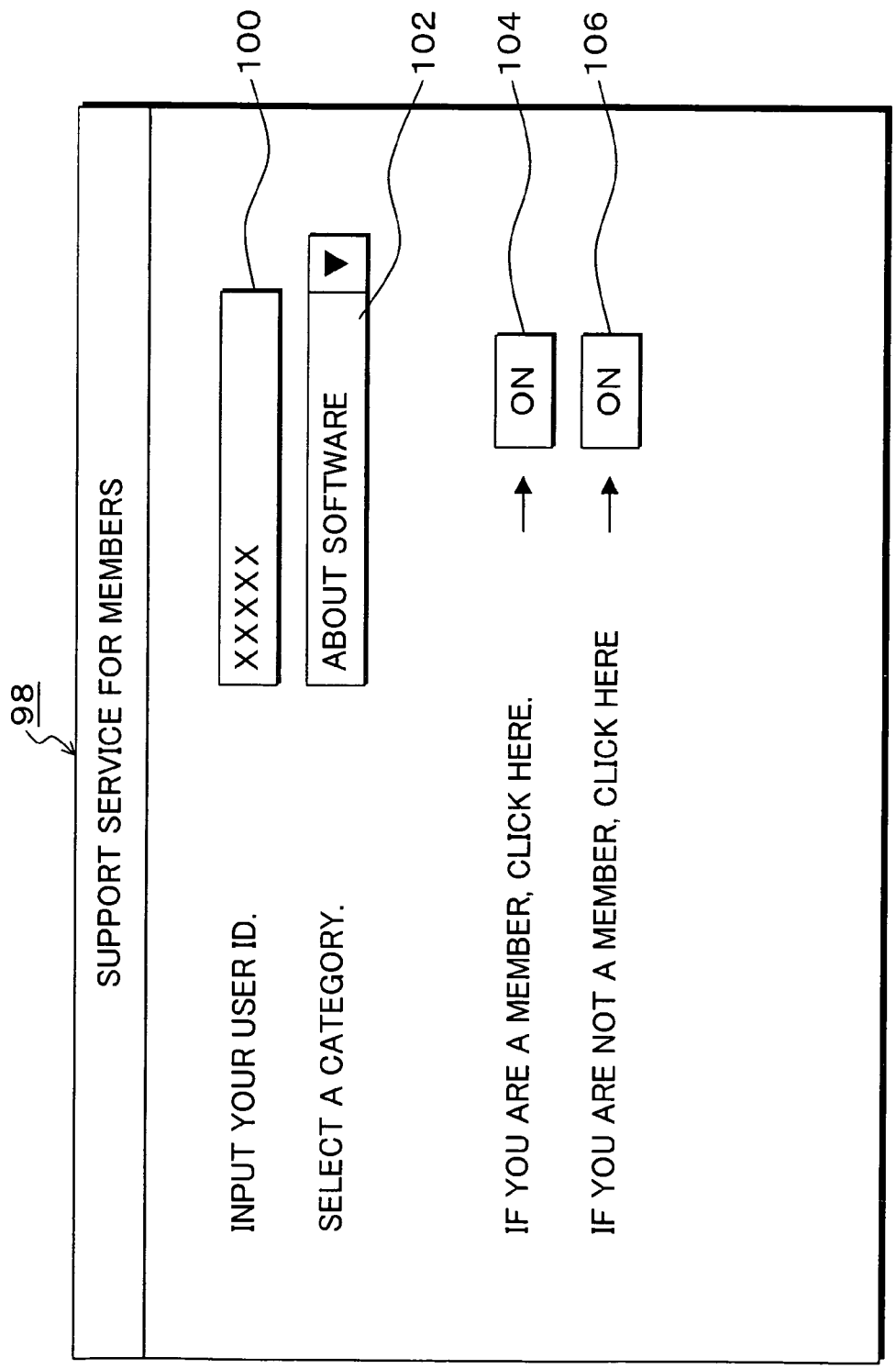
FIG. 14 is an explanatory diagram of an application for support screen of client using an IP telephone for the server of FIG. 2.
Figure 15:
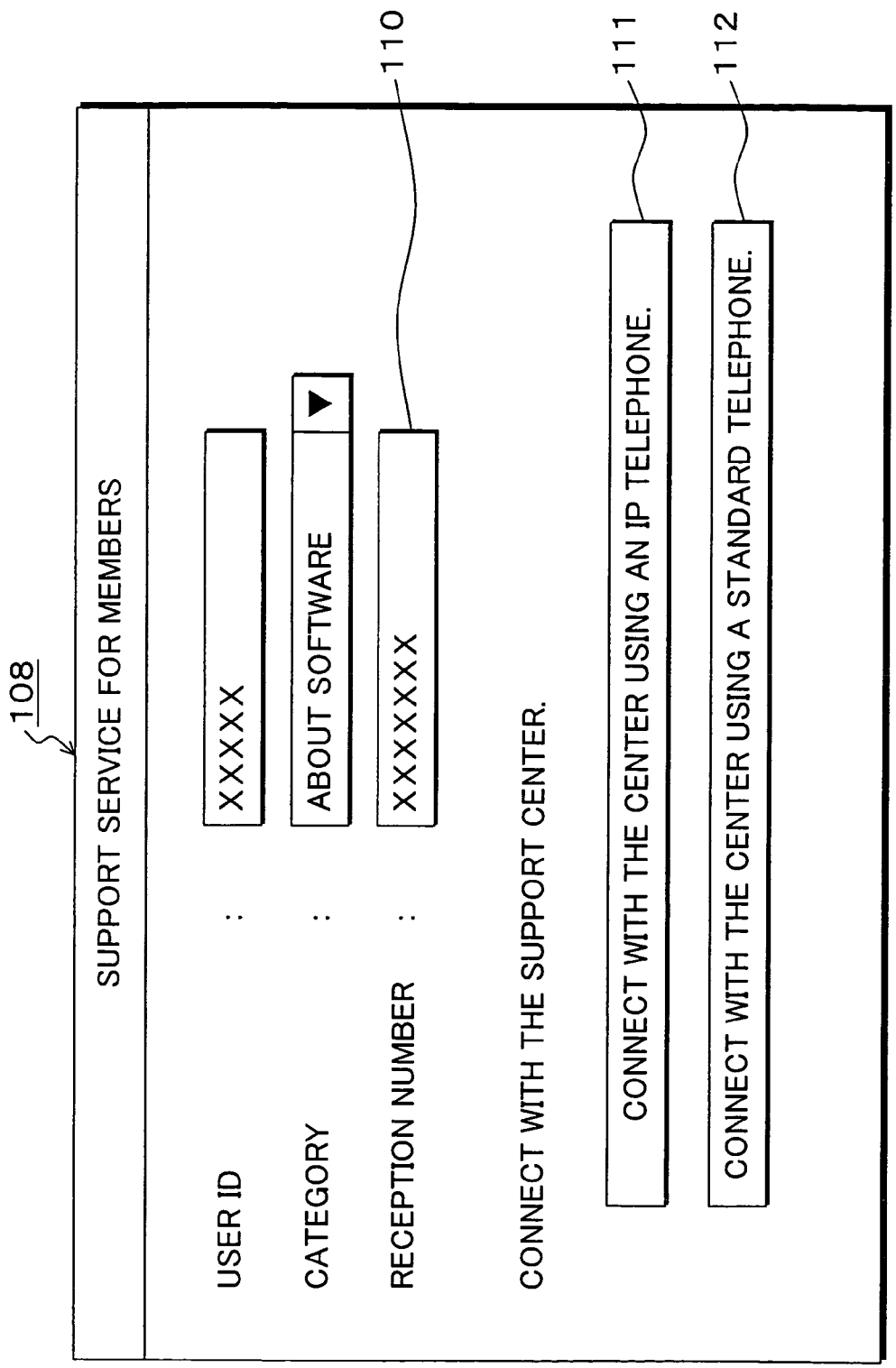
FIG. 15 is an explanatory diagram of a call selection screen for calling an IP telephone to the server of FIG. 2.
Figure 16:
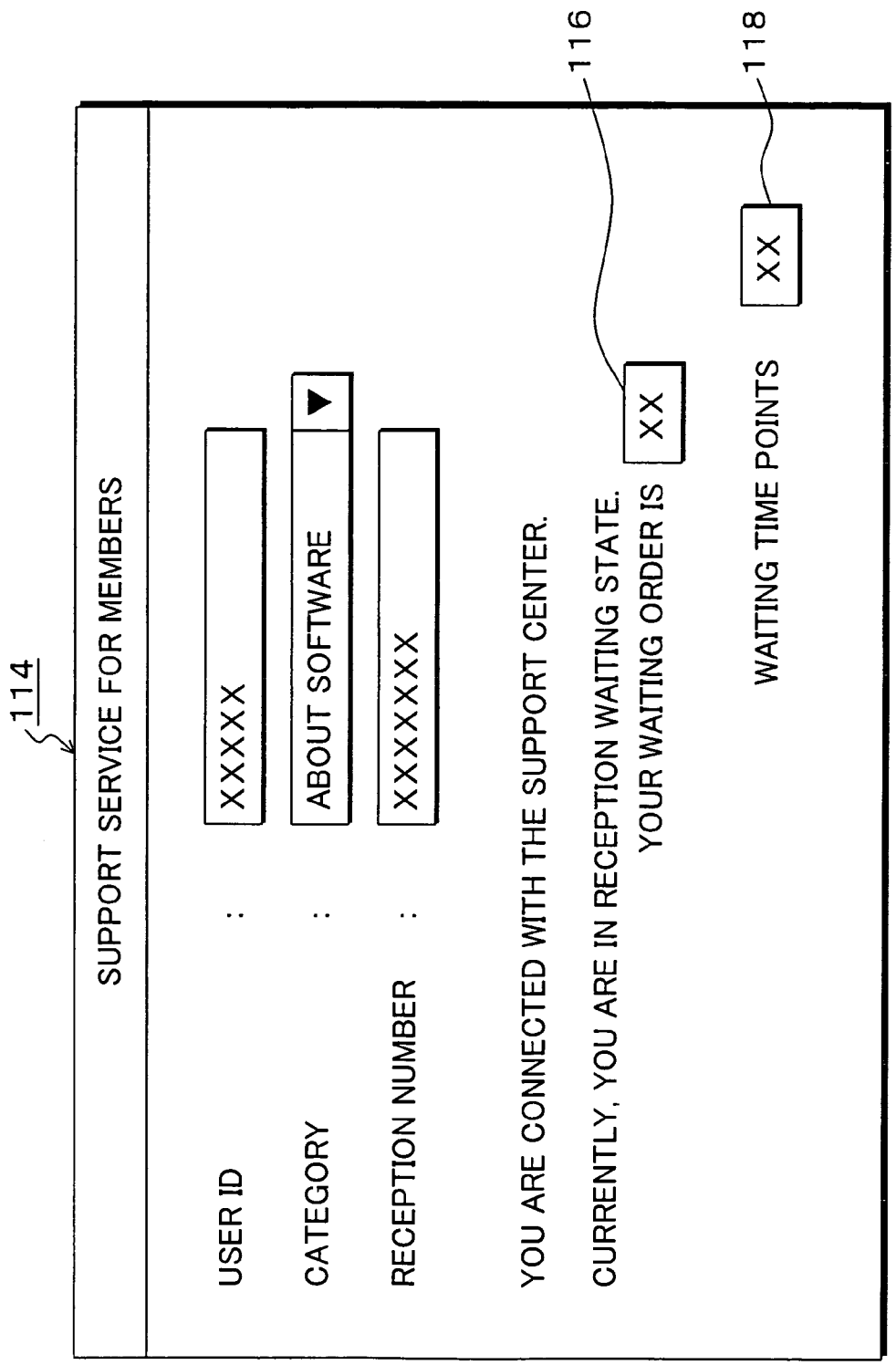
FIG. 16 is an explanatory diagram of a stand-by screen displayed by a call connection to the server of FIG. 2 until start of support.

FIG. 14 is an application for support screen 98 in the case that activating an application for support 35-2 of the client 32-2 and using the IP telephone are involved. This application for support screen 98 has a user ID input field 100 and a category selection dialogue 102 and is further comprised of a member selection button 104 and a non-member selection button 106, therefore, it is the same as the case of the client 32-1. When the user uses application for support screen 98 to select the user ID and the category and clicks the member click button 104, the member registration is verified on the server side; the reception number is sent; and the call selection screen 108 of FIG. 15 is displayed. This call selection screen 108 is provided with a reception number display field 110, where the reception number "XXXXXXX" notified from the server is displayed. At this point, the user clicks an IP telephone selection portion 111, because the user uses the IP telephone 36. In this way, when the IP telephone selection portion 111 is clicked, the VoIP process unit 37 is activated in the client 32-2 of FIGS. 1A and 1B and accesses to the VoIP process unit 44 provided to the telephone coordination server 12 in the support center as shown in FIG. 2 via the internet 38 to establish the communication path between the telephone coordination server 12 and the client 32-2 for transmitting voice information. At this point, for using the IP telephone 36, since the IP address of the telephone coordination server 12 is registered in the VoIP process unit 37 of the client 32-2 in advance, the communication path is automatically established by clicking the IP telephone connection button on the call selection screen 108 of FIG. 15. Subsequently, the reception number notified from the server is automatically notified to the server side via the communication path for the voice information of VoIP, and the server receives the reception number from the client 32-2 and registers and allocates it to the queue 54. As the process result of these registration and allocation of the reception number to the queue 54 in the server, for example the wait order and the wait time points are notified as the wait state information, and a stand-by screen 114 as shown in FIG. 16 is displayed. On this stand-by screen 114, the wait order "XX" is displayed in a wait order field 116, and the wait time points "00" is displayed in a points display field 118 as an initial value and is increased by one (1) point, for example, for every one (1) minute. When the server side becomes available for response for support, the confirmation notification of start of support is sent to the client 32-2, and a support start screen 120 of FIG. 17 is displayed. Since a supporter selection list 122 is displayed on the support start screen 120, when the user selects a supporter appropriate for the subject of inquiry and clicks any of selection buttons 124-1 to 124-3, the call connection with the selected support client is executed in the server, and the user can inquire to the supporter in the center by the IP telephone 36.

Figure 18:
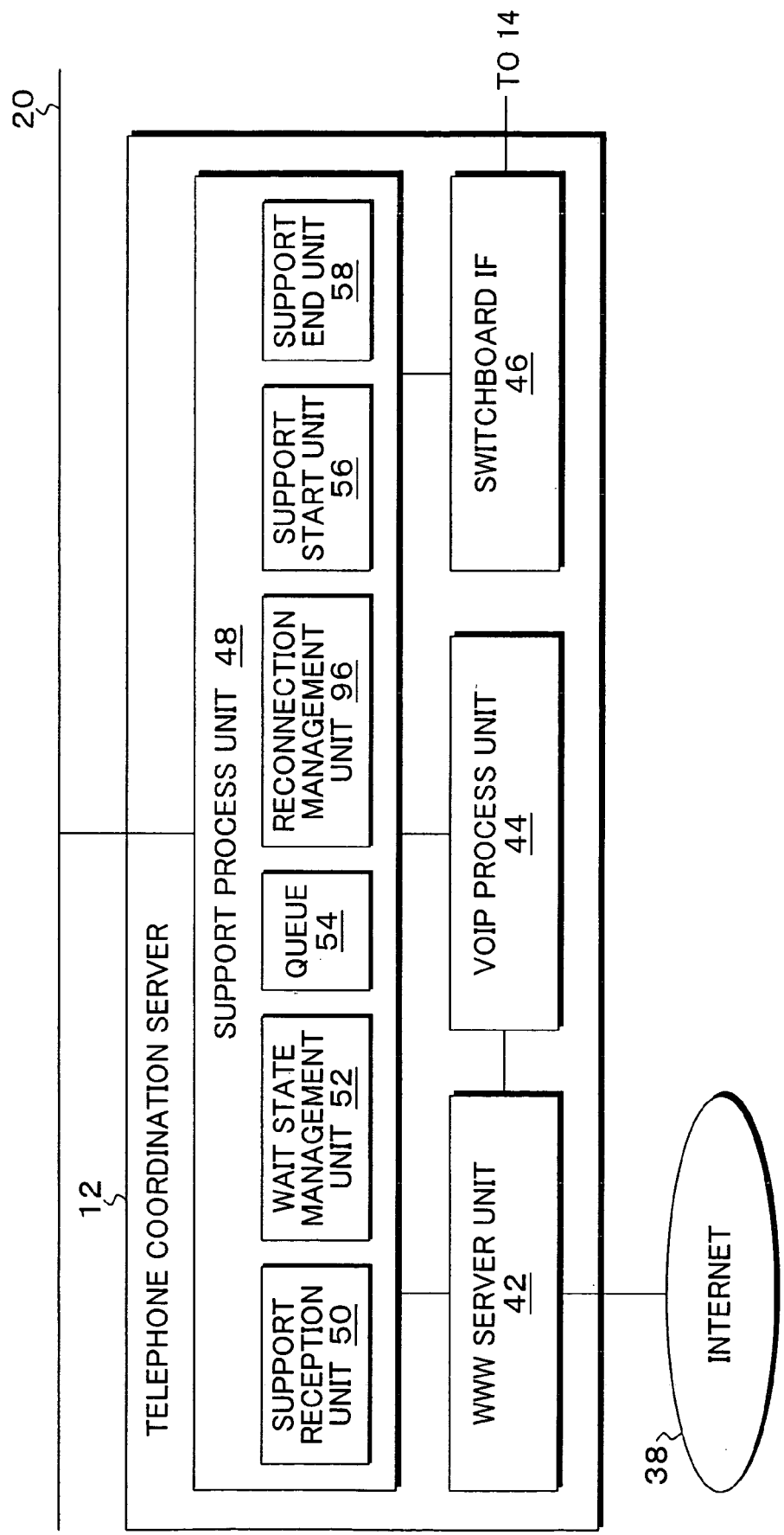
FIG. 18 is a block diagram of another embodiment of the server for hanging up the phone and waiting, according to the invention.

FIG. 18 is another embodiment of the telephone coordination server 12 provided to the support center 10 of FIGS. 1A and 1B, and this embodiment is wherein after the telephone call is made to the support center 10 and is in stand-by state, if the wait time for of support is long, it is possible to hang up the phone once and make a telephone call again to receive support when the wait time is close to the end. The telephone coordination server 12 of FIG. 18 is comprised of a WWW server unit 42, a VoIP unit 44, a switchboard interface 46 and a support process unit 48. A support reception unit 50, a wait state management unit 52, a queue 54, a support start unit 56 and a support end unit 58 provided to the support process unit 48 are the same as the embodiment of FIG. 2. In addition to these, in the embodiment of FIG. 18, a reconnection management unit 96 is provided additionally. When the held call connection from the user is disconnected during the wait state of support, the reconnection management unit 96 continues notification and display of the information indicating current wait state and the wait time points increased as the wait time elapses to the client, as well as executes a process which requests the client to reconnect by the telephone at the point of time immediately before, for example one (1) minute before, the start of support. In this way, if the wait time is long when the user makes a telephone call to the center, the user may hang up the phone once, and if the telephone call is hanged up, a stand-up screen is displayed on the client; the remaining time until start of support from the server is sequentially updated; the guidance for making telephone call is displayed, for example, one (1) minute before start; and if the user calls at this point, the user can be connected to a supporter and can inquire almost without the wait time. A transition of the screen on the client side in the embodiment of FIG. 18, in which the telephone call to the center can be disconnected, in the case that the client uses the standard telephone 34, is described as follows.

Figure 19:
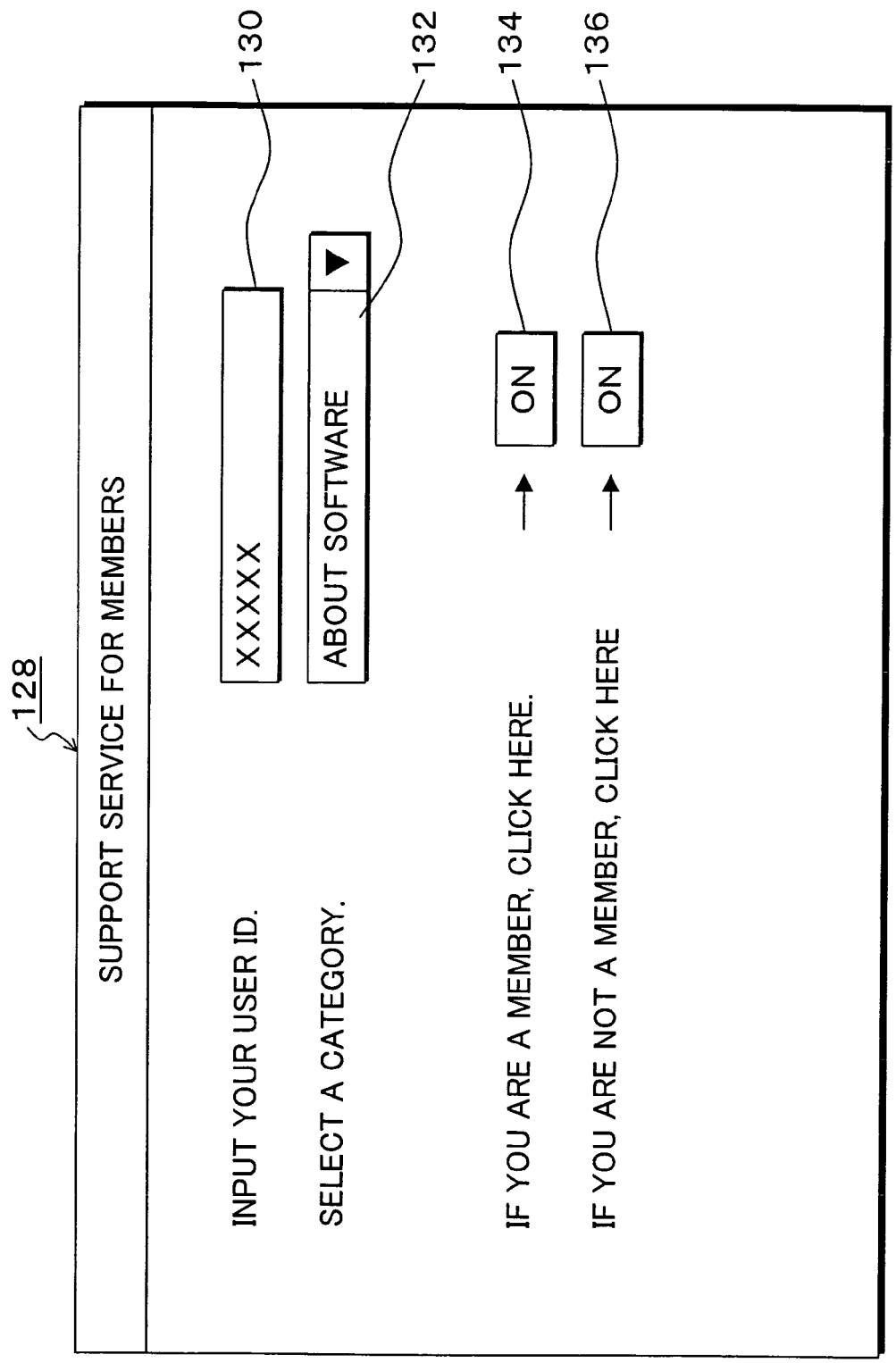
FIG. 19 is an explanatory diagram of an application for support screen for the server of FIG. 18.

FIG. 19 is an application for support screen 128 which is displayed by activating the application for support 35-1 of the client 32-1 of FIGS. 1A and 1B which uses the standard telephone 34, and the user enters the user ID in a user ID input field 130, select the category that the user inquires from a category selection dialogue 132 and clicks a member button 134 to execute the application for support. Subsequently, the screen is changed to a call selection screen 138 of FIG. 20, where the reception number notified from the server is displayed in a reception number display field 140. At this point, the user clicks the standard telephone selection screen 142, because the user uses the standard telephone 34. In this way, the screen is changed to a calling screen 144 of FIG. 21, and the telephone call is made by the standard telephone to the telephone number shown in a center telephone number display field 146. On this call connection by the standard telephone 34, the guidance for inputting the reception number is performed by the message of the interactive voice response from the side of the support center 10, therefore the reception number displayed in the reception number display field 140 is inputted by the push buttons, and a confirmation button 148 is clicked. In this way, the reception number to the call connection of the user is notified to the side of the support center 10; its registration and allocation to the queue 54 in the telephone coordination server 12 is executed; and the screen is changed to a stand-by screen 150 of FIG. 22. On this stand-by screen 150, a wait time display field 152 is displayed, and for example, "06" minutes are displayed as the wait time. In this way, if the wait time notified on the stand-by screen 150 is long, the user may hang up the phone once to wait. If the user hangs up the phone, the standard telephone is hanged up after clicking a telephone disconnection notification button 154. When the telephone is hanged up in this way, the screen is changed to a reconnection stand-by screen 156 of FIG. 23. On the reconnection stand-by screen 156, a message indicating the telephone disconnection state which is "Currently, the call to the support center is disconnected" is displayed, and the wait time for start of support is displayed continuously in a wait time display field 152. Of course, in a point display field 155, the wait time point which is increased as the wait time elapses is displayed.

Figure 26:
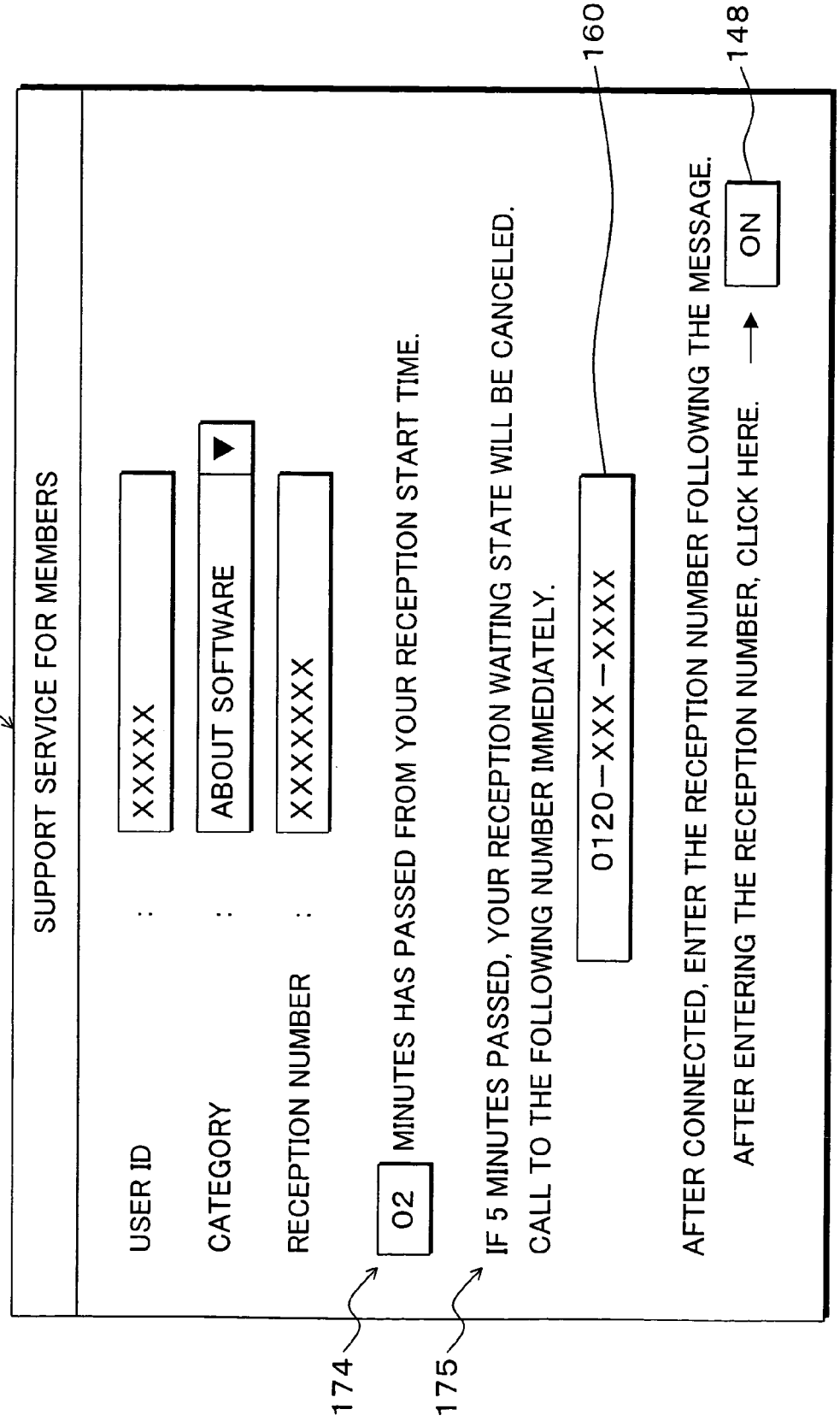
FIG. 26 is an explanatory diagram of a reconnection stand-by screen in the case that a support start time has been passed in the server of FIG. 18.
Figure 27:
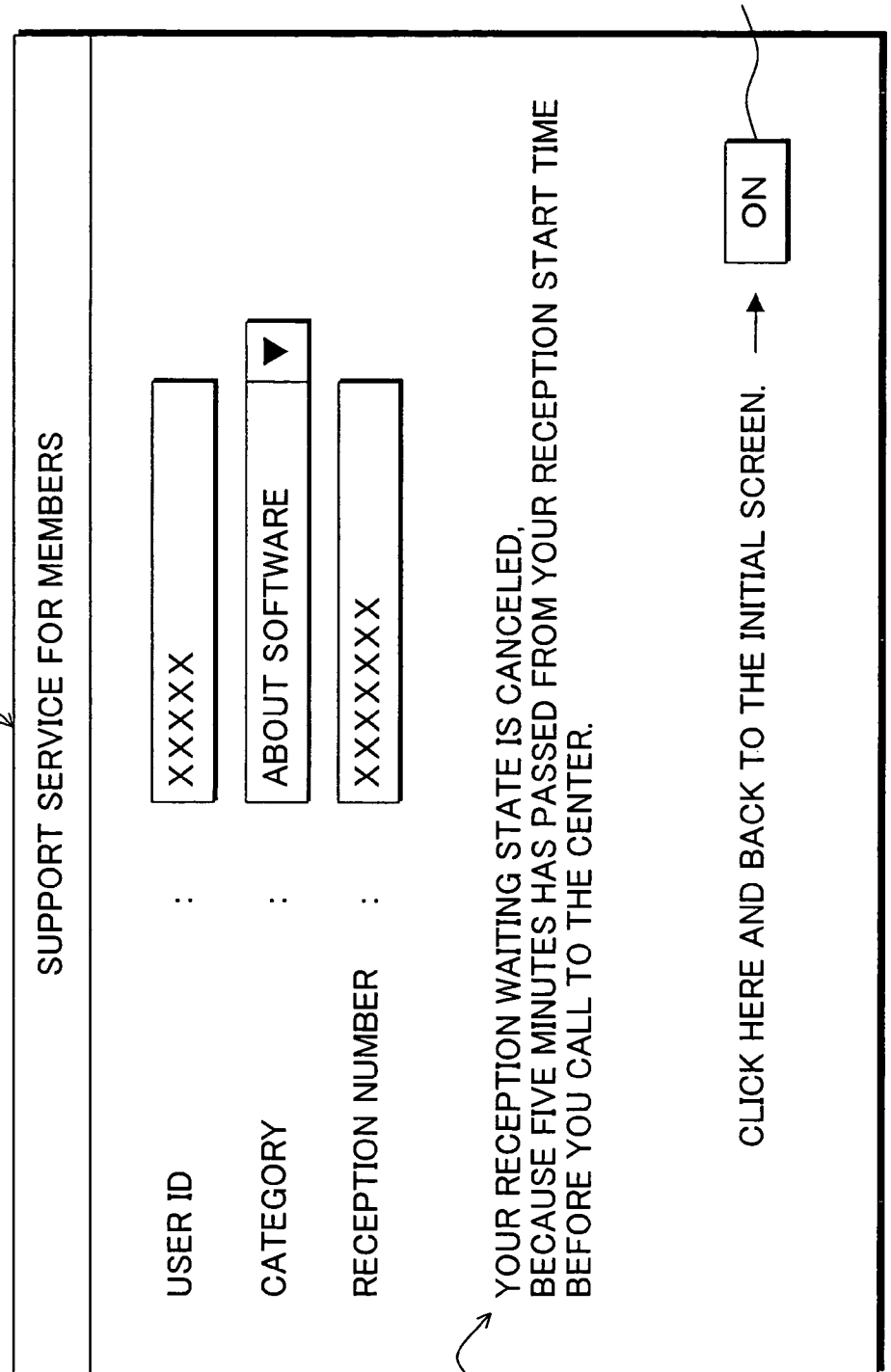
FIG. 27 is an explanatory diagram of a cancel screen in the case that five (5) minutes has passed from the start of support in the server of FIG. 18.

In the state of the reconnection stand-by screen 156, in which the telephone is hanged up, as shown in FIG. 23, when the remaining time becomes one (1) minute, the screen is changed to a reconnection stand-by screen 158. On this reconnection stand-by screen 158, a request message 159 to urge for making a telephone call to the support center 10 is displayed, and the remaining time for start of support "01" is displayed in the wait time display field 154 in it. Also, the telephone number 160 of the support center 10 is displayed under it, because the standard telephone is used. At this point, if the user makes a telephone call to the displayed telephone number of the support center 10 from the standard telephone 34, an automatic response is performed by a voice message; the reception number of the reception number display unit 140 is input by the push buttons according to the input guidance for the reception number; and after that, a confirmation button 162 is clicked. To the reconnection of the telephone call to the center by the user, the telephone coordination server 12 of the support center 10 sends the confirmation notification of start of support with the supporter selection information to the client at the point of time that the response-available flag is obtained from any of the support clients 18-1 to 18-3, and a support start screen 164 as shown in FIG. 25 is displayed. At this point, if the user selects a supporter considered to be appropriate from a supporter selection list 166 and clicks any of selection buttons 168-1 to 168-3, the call connection to the selected supporter is performed to start the support. On the other hand, after changed to the reconnection stand-by screen 158 when the remaining time is about one (1) minute as shown in FIG. 24, if the wait time has been passed because, for example, the user leaves the seat, the screen is changed to a reconnection stand-by screen 172 as sown in FIG. 26. On this reconnection stand-by screen 172, a message 174 indicating the elapsed time from the reception start time is displayed, and a warning message 175 which tells that the cancellation is performed if further five (5) minutes elapses. Therefore, in the case that the reception start time has been passed, until five (5) minutes elapses, the user can receive the start notification by the support start screen 164 as shown in FIG. 25 to begin receiving support by the selection response of the supporter by making telephone call to the telephone number in a center telephone display field 160, entering the reception number and clicking the confirmation button 148, but if five (5) minutes elapses without making the telephone call, a cancellation process is executed, wherein the reception number of the user for which five (5) minutes has passed is removed from the queue 54 in the telephone coordination server 12 of the support center 10. In this way, if the cancellation process is executed when five (5) minutes has passed from the reception start time, the screen is changed to a cancel screen 176, and a cancel message 177 is displayed. Therefore, if the application for support to the support center is wanted again, the user has to back to the application for support screen 128 of FIG. 19 by clicking a return button 178 and repeat the procedures again. Also, as shown in FIG. 27, if a cancellation is notified on the cancel screen 176, the wait time points counted for this process are discarded, and the points will not updated.

Figure 28A:
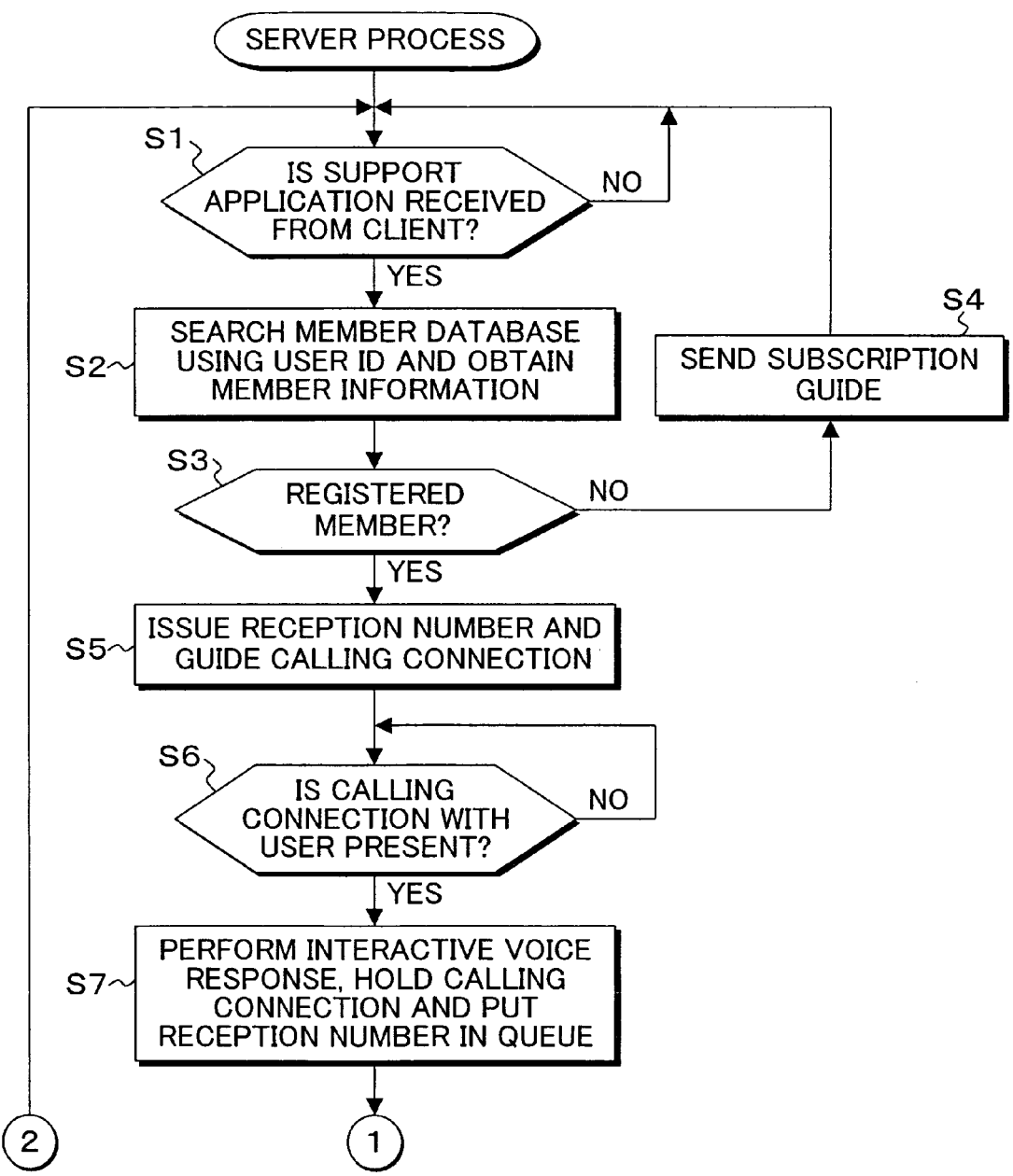
FIGS. 28A to 28C are flowcharts of the server process of FIG. 18.
Figure 28B:
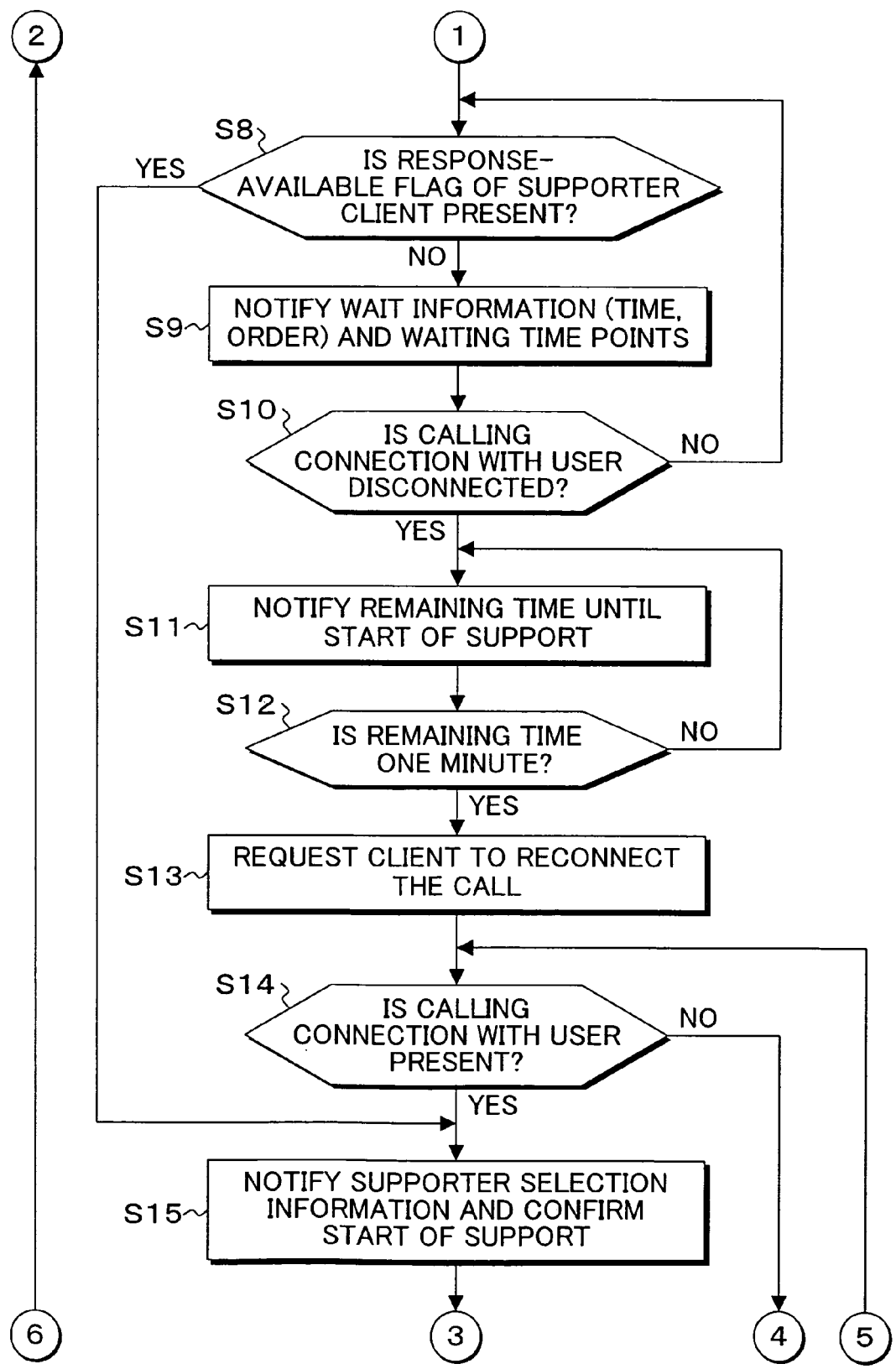
Figure 28C:
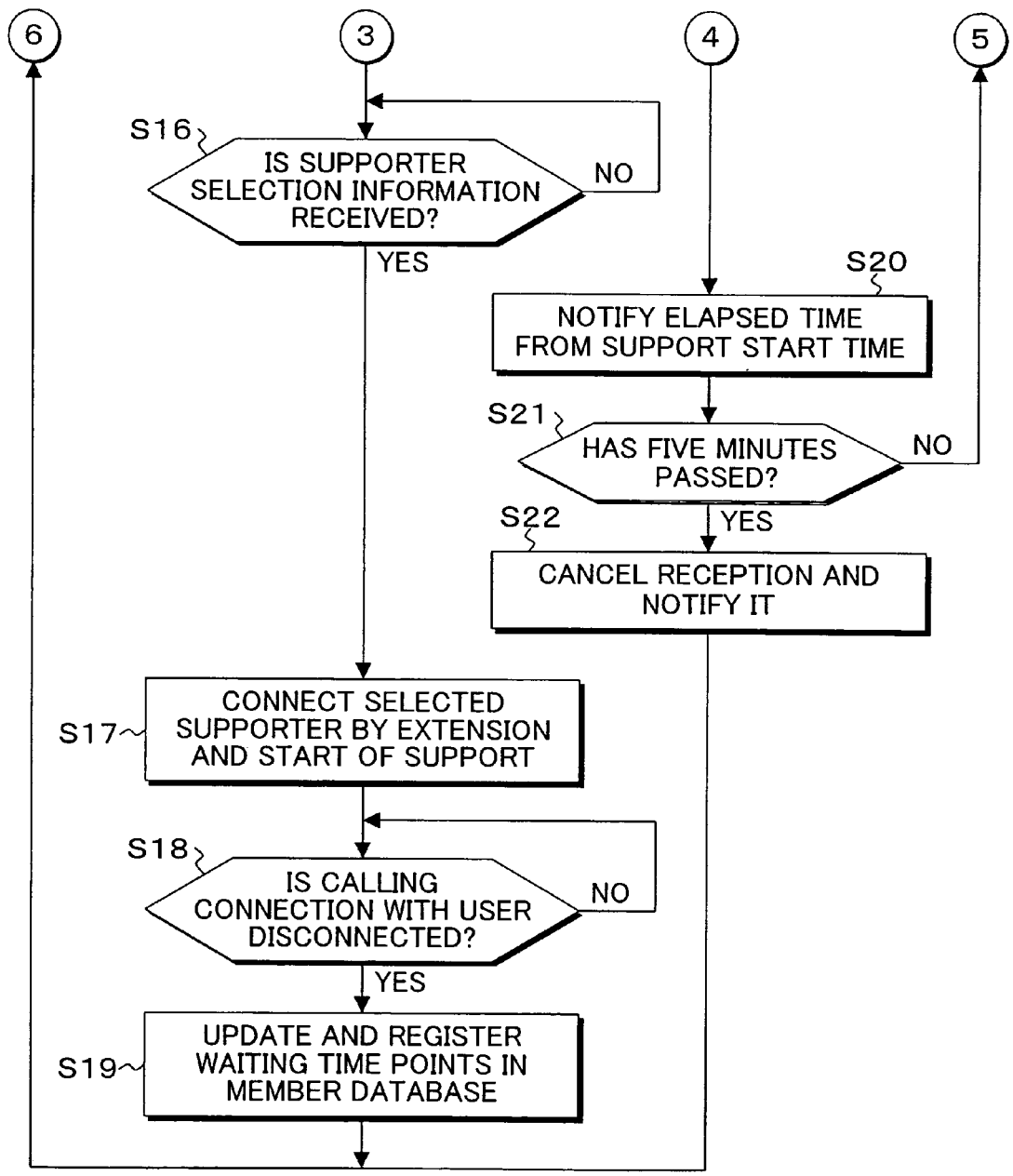

FIGS. 28A to 28C are flowcharts of the server process of the telephone coordination server 12 of FIG. 18, in which the telephone call may be hanged up in the middle, and the process procedures are as follows.

Step S1: Whether the reception of the application for support from the client is present or not is checked, and if received, proceed to step S2.

Step S2: Search the member database 22 by the user ID to obtain member information.

Step S3: Verify whether it is a registered member or not, and if it is not a registered member, proceed to step S4, and if it is a registered member, proceed to step S5.

Step S4: This is the case that it is not a registered member, and the guide to admission is sent.

Step S5: This is the case of the registered member, and the reception number is issued, and the call connection to the center is guided.

Step S6: The call connection by the telephone call from the user on the client side is monitored, and if the call connection is present, proceed to step S7.

Step S7: Urge input of the reception number on the call connection from the user of the client side by the interactive voice response, then register and allocate the reception number in the queue after holding the call connection.

Step S8: Check whether the response-available flag from the support client is present or not, and if the response-available flag is present, proceed to step S15, and if not present, proceed to step S9.

Step S9: Notify the wait information such as the wait time and order and the wait time points to the client side.

Step S10: Disconnection of the telephone call from the user on the client side is monitored, and if disconnection is not present, back to step S8, and if disconnection is identified, proceed to step S11.

Step S11: Notify the remaining time for start of support in the state that the call connection is disconnected to the client to display.

Step S12: Whether the remaining time for start of support is one (1) minute or not is monitored, and if it is not one (1) minute, back to step S11, and if it becomes one (1) minute, proceed to step S13.

Step S13: Request the client to reconnect the call.

Step S14: Whether the call connection by the telephone call from the user on the client side is present or not is monitored. If the call connection is present, proceed to step S15, and if the call connection is not present, proceed to step S20.

Step S15: This is the case that the reconnection of the telephone call from the user is present, and the supporter selection information is notified to the user for making the user to confirm start of support, and then proceed to step S16 of FIG. 28C.

Step S16: Whether the reception of the supporter selection information from the client is present or not is checked, and if the selection information is received, proceed to step S17.

Step S17: Connect the support client selected by the user by extension and form the connection by extension with the telephone of the user to start support.

Step S18: Disconnection of the telephone call from the user on the client side is monitored, and if disconnection is identified, proceed to step S19.

Step S19: Add the wait time points to the past wait time points for accumulation and perform update registration.

Step S20: This is the case that the call connection by the telephone call from the user on the client side is not performed again in step S14 of FIG. 28C, and if the support start time has been passed, notify the elapsed time from the start time to the client to display.

Step S21: Whether the elapsed time from the support start time reaches five (5) minutes or not is determined, and if it is before five (5) minutes, back to step S14 of FIG. 28C, and if five (5) minutes elapse, proceed to step S22.

Step S22: This is the case that the elapsed time from the support start time is more than five (5) minutes, and the reception is canceled, and the cancellation is notified to the client.

Figure 29A:
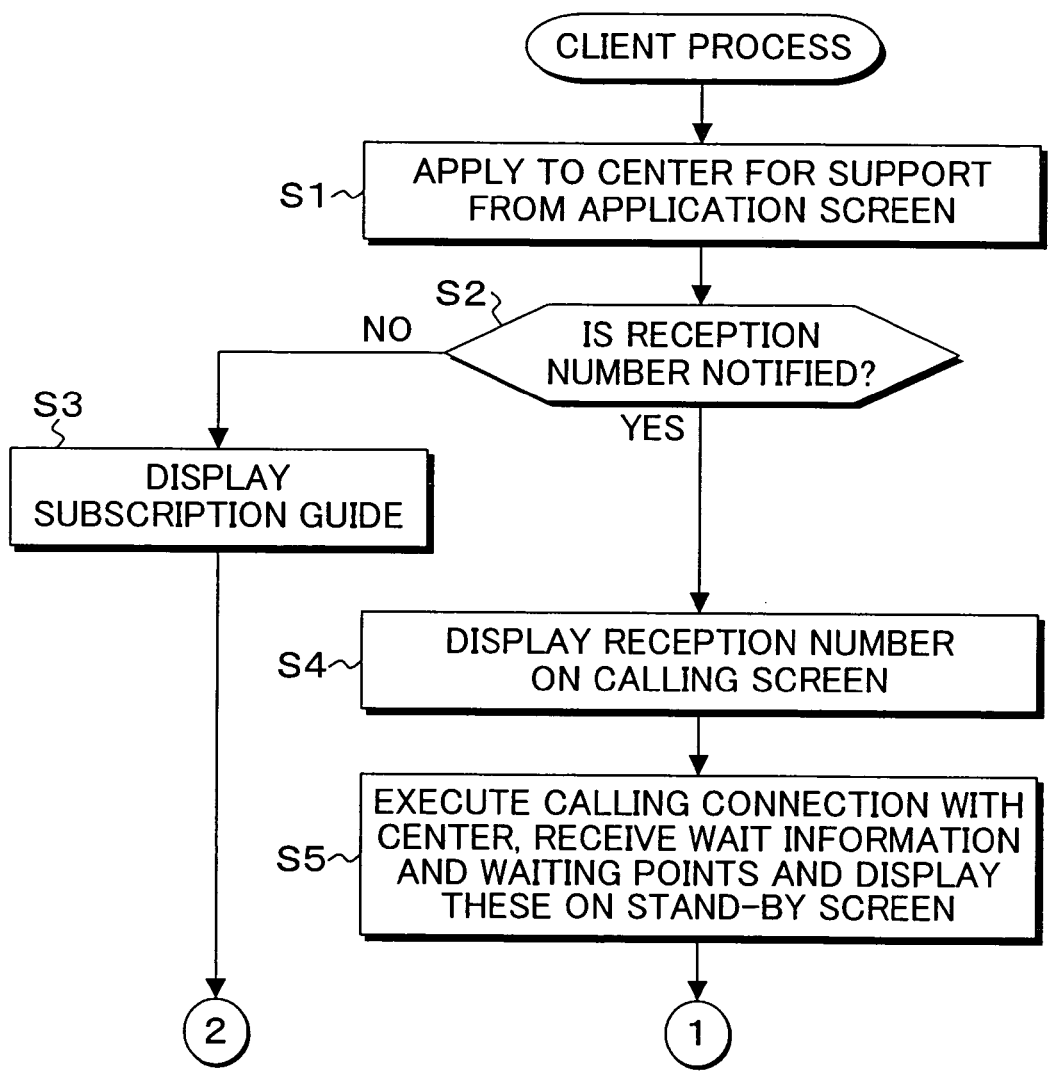
FIGS. 29A and 29B are flowcharts of a client process corresponding to the server process of FIG. 18.
Figure 29B:
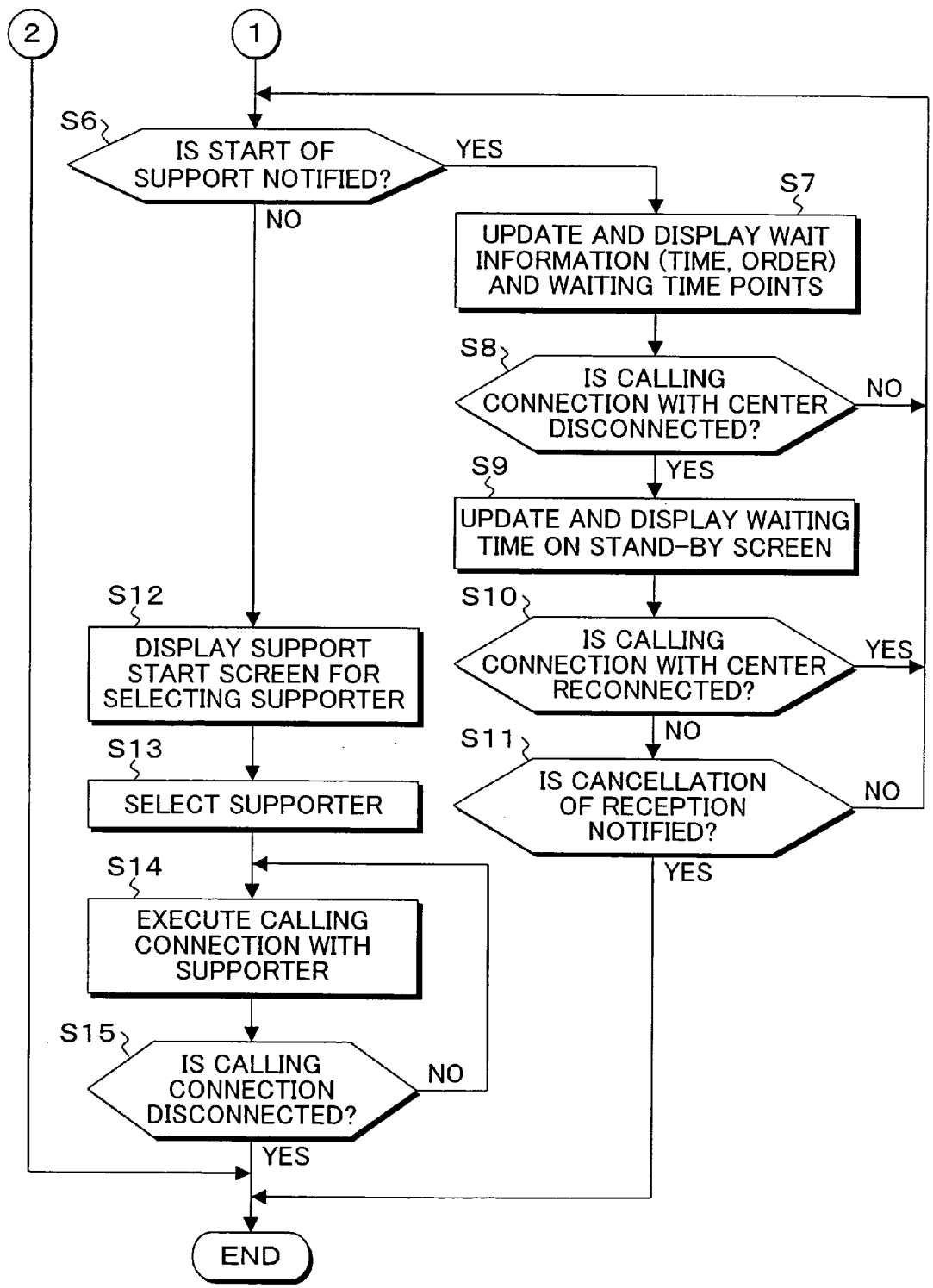

FIGS. 29A and 29B are flowcharts of the client process, in which the telephone call may be hanged up in the middle, corresponding to the server process of FIG. 18, and the process procedures are as follows.

Step S1: Apply support to the center from the application for support screen 128 of FIG. 19.

Step S2: Determine whether the notification of the reception number based on the verification of the member registration from the server of the center is present or not, and if the notification is not present, proceed to step S3, if the notification is present, proceed to step S4.

Step S3: Since this is a non-member without the notification of the reception number, display the guide to admission.

Step S4: Display the sent reception number on the calling screen. For example, in the case that the user uses the standard telephone, the reception number is displayed on the call selection screen 138 of FIG. 20.

Figure 20:
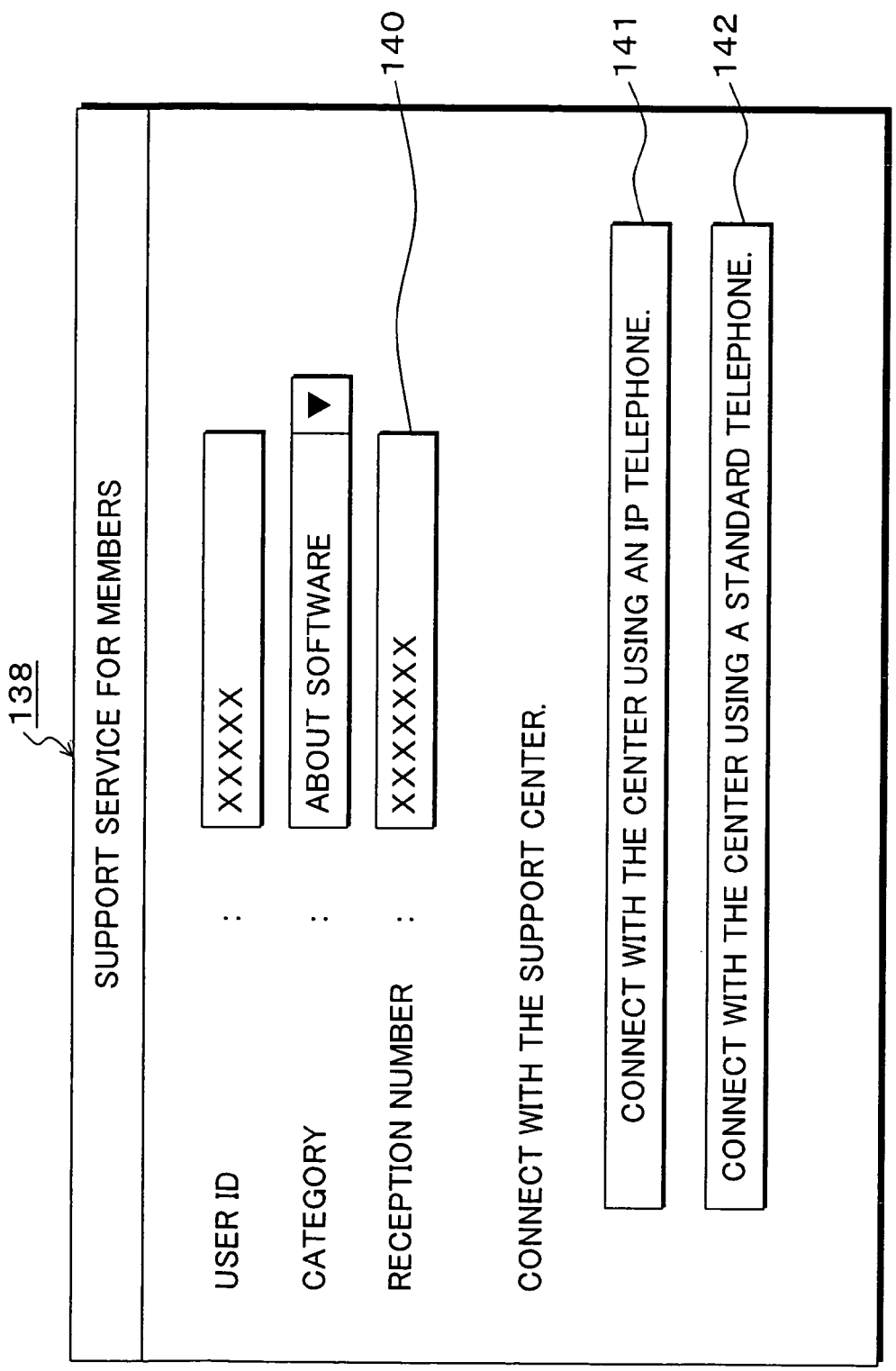
FIG. 20 is an explanatory diagram of a call selection screen when a standard telephone is selected to the server of FIG. 18.
Figure 21:
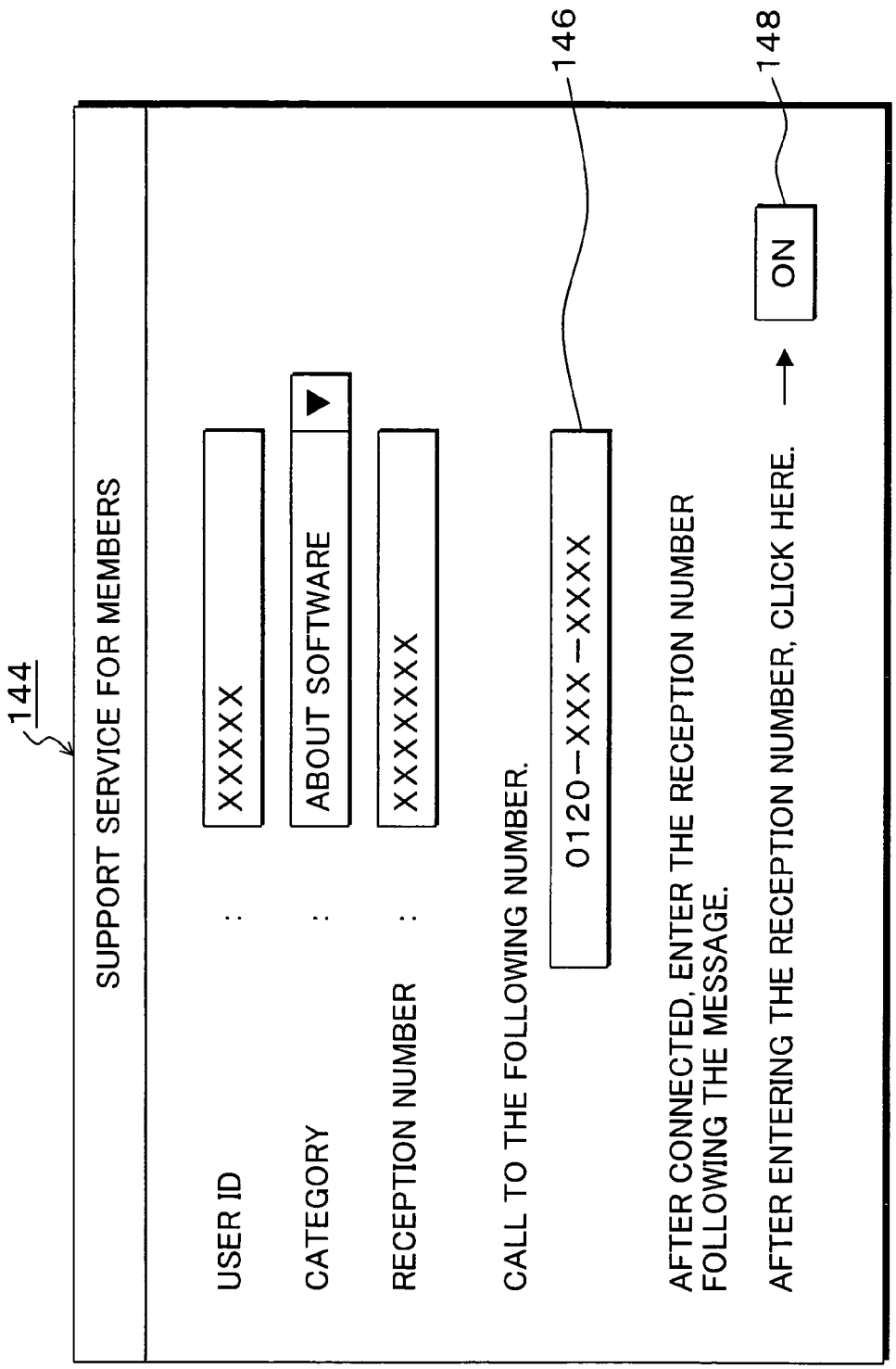
FIG. 21 is an explanatory diagram of a calling screen for calling a standard telephone to the server of FIG. 18.
Figure 22:
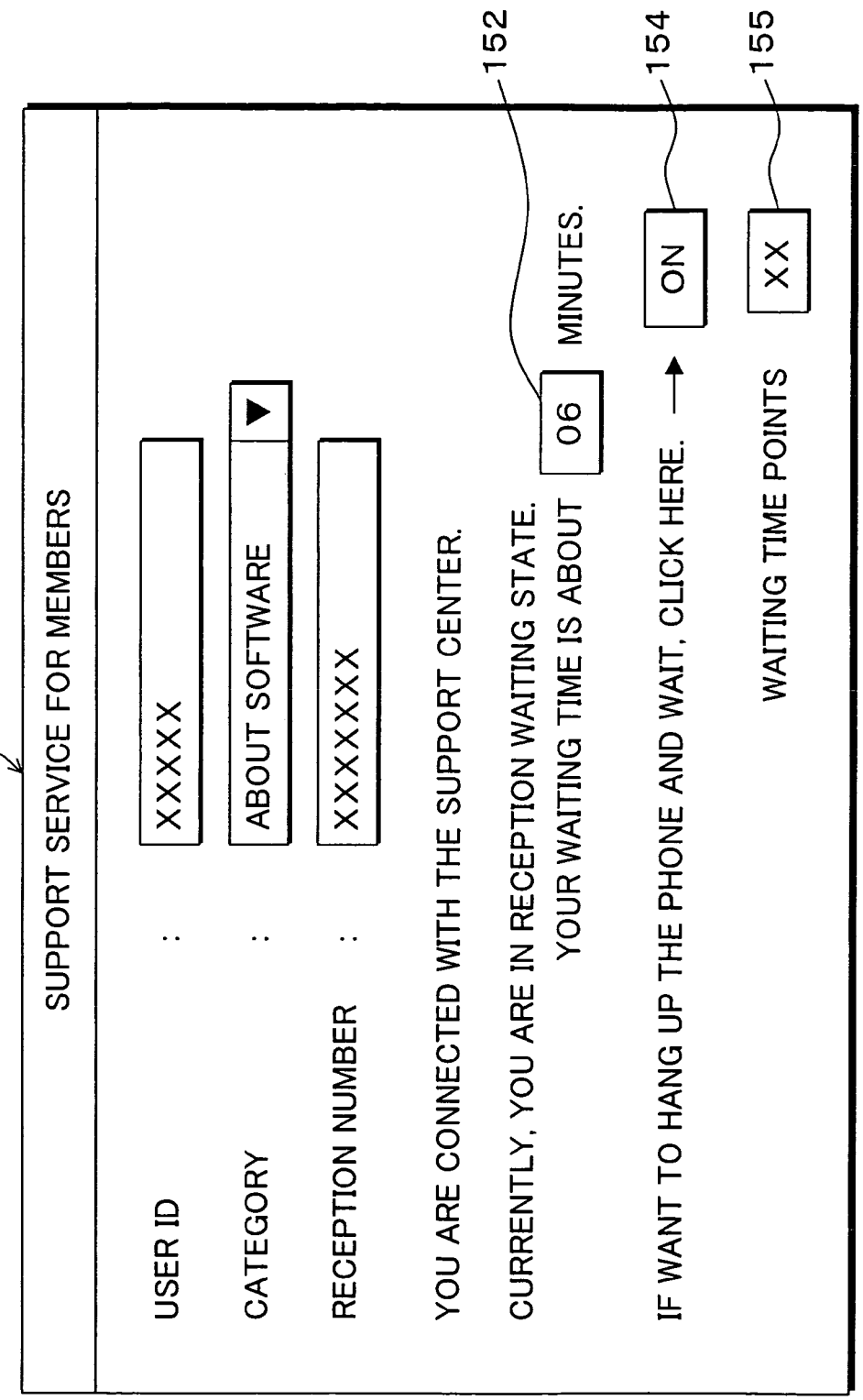
FIG. 22 is an explanatory diagram of a stand-by screen displayed by a call connection to the server of FIG. 18 until start of support.

Step S5: Perform the call connection with the center, receive the wait information and the wait time points and display the stand-by screen. In the case of the standard telephone, the standard telephone button 142 on the call selection screen 138 of FIG. 20 is clicked; the screen is changed to the calling screen 144 of FIG. 21; a telephone call is made to the telephone number in the center telephone display field 146; and then, by performing operations to enter the reception number with the push buttons and click the confirmation button 148, the stand-by screen 150 of FIG. 22 is displayed.

Step S6: Whether the support start notification from the server of the center is present or not is-determined, and if the start notification is not present, proceed to step S7, and if the start notification is present, proceed to step S12.

Step S7: On the stand-by screen 150 of FIG. 22, Update and display information for the stand-by state which is the time and the order notified from the server and the stand-by time points.

Step S8: Disconnection of the call connection by the user to the center is monitored, and if disconnection is not present, back to step S6, and if disconnection is identified, proceed to step S9.

Step S9: Change to the reconnection stand-by screen 156 of FIG. 23, and update and display the wait time.

Step S10: Disconnection of the call connection with the center is monitored, and if disconnection is not present, proceed to step S11, and if disconnection is present, proceed to step S6.

Step S11: Determine whether the reception cancellation notification from the server of the center is present or not in the state that reconnection by telephone call with the center is not present, and if the cancellation notification is not present, back to step S6, and if the cancellation notification is present, terminate a series of processes. Until this reception cancellation notification is received, the screen is changed to the reconnection stand-by screen 158 of FIG. 24 and the reconnection stand-by screen 172 of FIG. 26, and when the cancellation is notified, the cancel screen 176 of FIG. 27 is displayed.

Step S12: This is the case that the support start notification is received from the server of the center, and the support start screen 164 of FIG. 25 is displayed.

Step S13: Select a supporter in the supporter selection list 166 on the support start screen 164 of FIG. 25 and notify to the server.

Step S14: The telephone call is conducted on the call connection with the support client on the center side Step S15: Disconnection of the call connection is monitored, and if the Disconnection of the call connection is not present, back to step s14, and if the Disconnection of the call connection is identified, terminate the process.

Next, in the embodiment of the telephone coordination server 12 of FIG. 18, in which the telephone call may be hanged up in the middle of the support start wait state, a transition of the screen on the client according to the application for support 35-1 in the case that the user uses the IP telephone 36 to inquire to the support center 10, such as in the case of the client 32-2 of FIGS. 1A and 1B, is described as follows.

Figure 30:
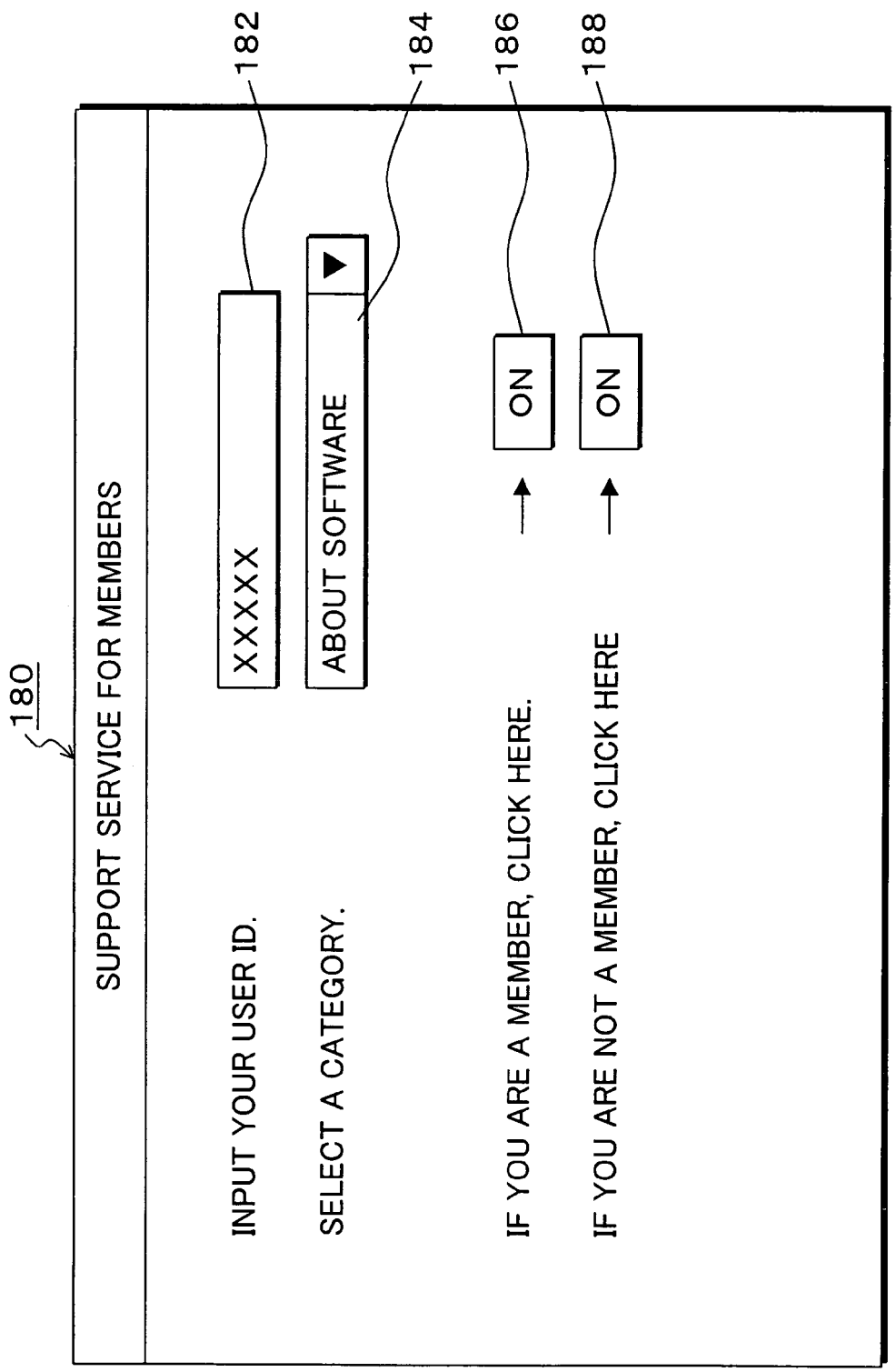
FIG. 30 is an explanatory diagram of an application for support screen for the server of FIG. 18 of a client provided with an IP telephone.
Figure 31:
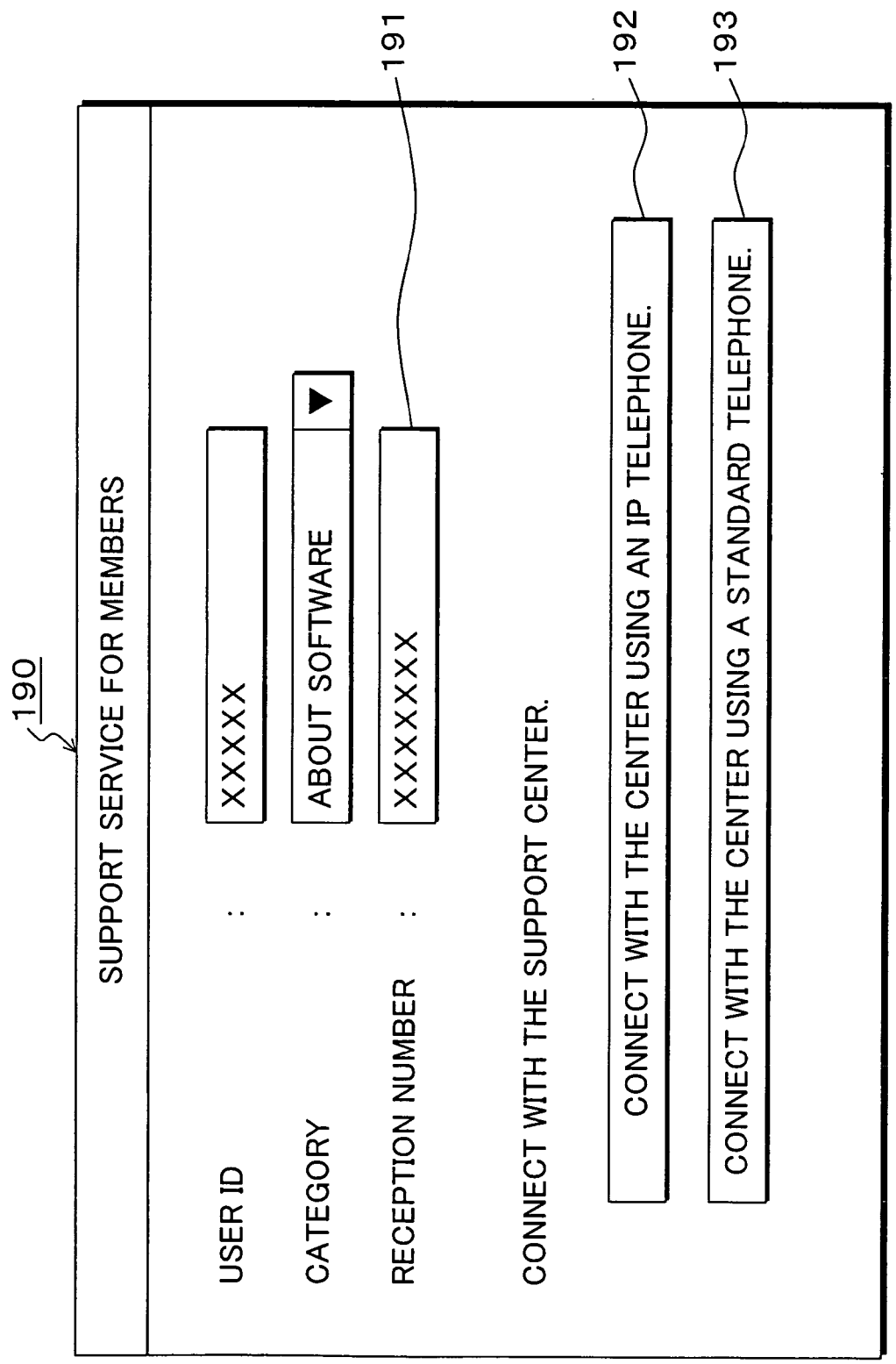
FIG. 31 is an explanatory diagram of a call selection screen when an IP telephone is selected to the server of FIG. 18.
Figure 32:
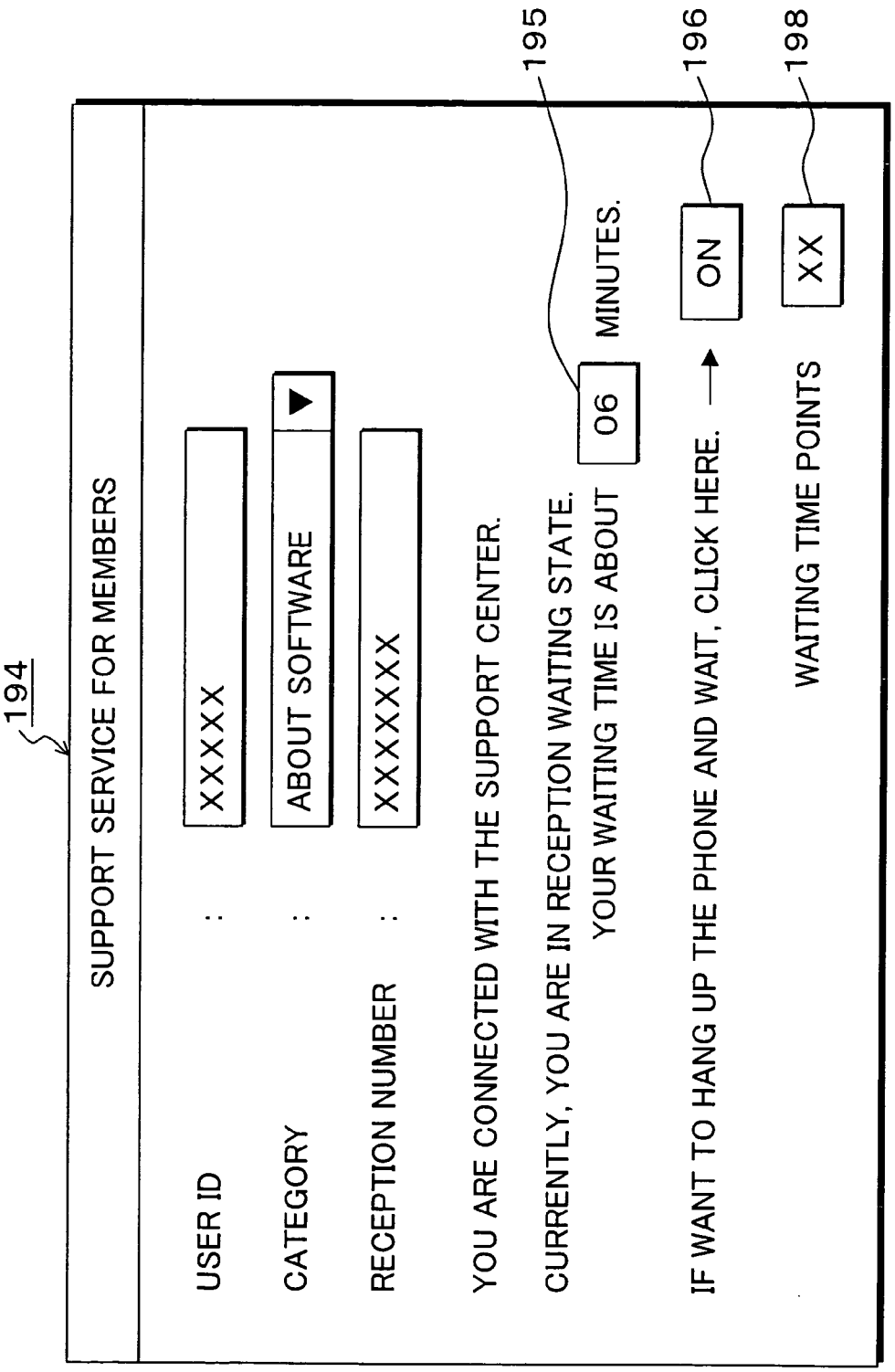
FIG. 32 is an explanatory diagram of a stand-by screen displayed by a call connection of an IP telephone to the server of FIG. 18 until start of support.
Figure 33:
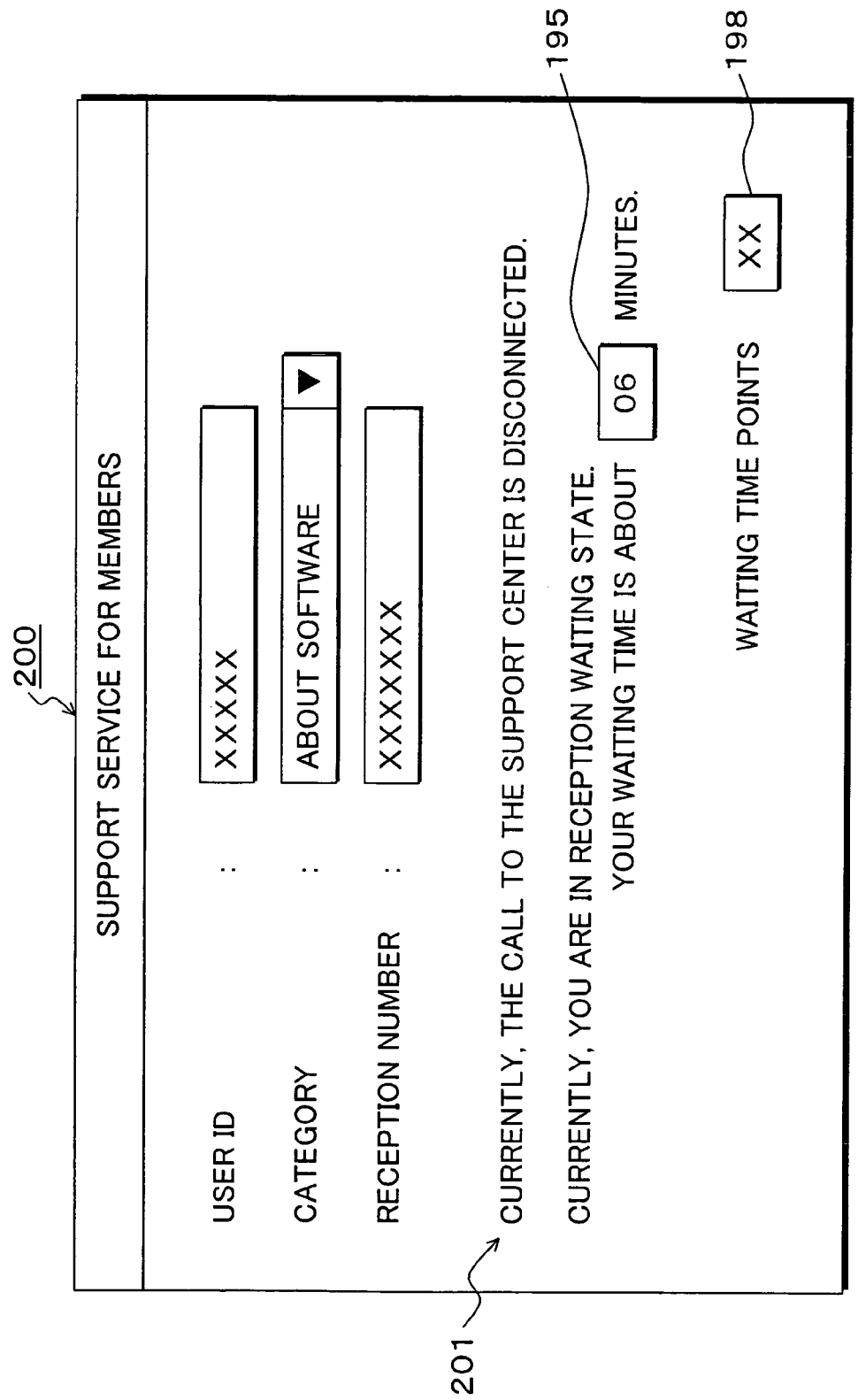
FIG. 33 is an explanatory diagram of a reconnection stand-by screen displayed until start of support in the case that the call connection to the server of FIG. 18 has been disconnected.
Figure 34:
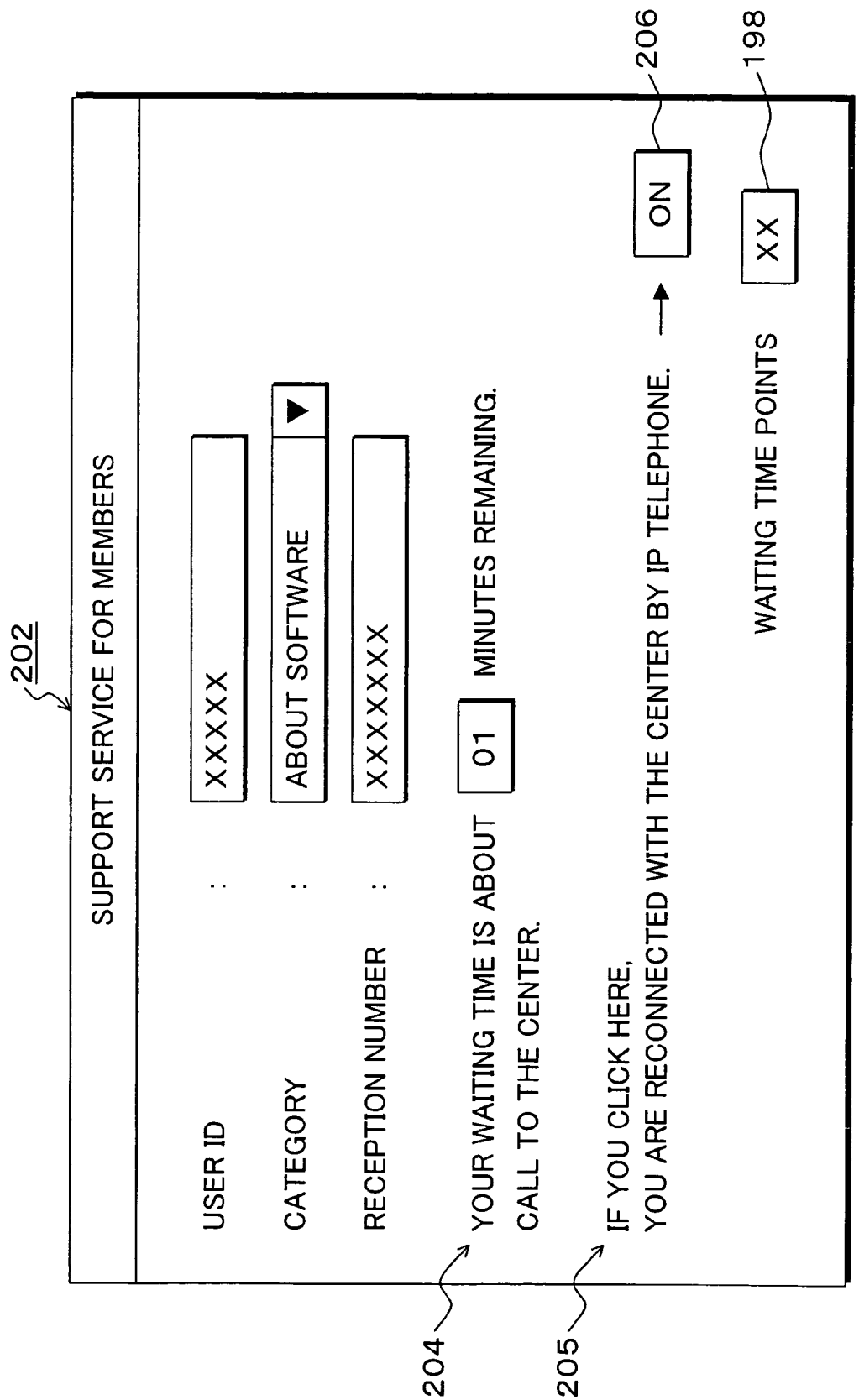
FIG. 34 is an explanatory diagram of a reconnection stand-by screen displayed when one (1) minute remaining to start support.
Figure 35:
FIG. 35 is an explanatory diagram of a support start screen for selecting a person-in-charge-of-support from the server of FIG. 18.
Figure 36:
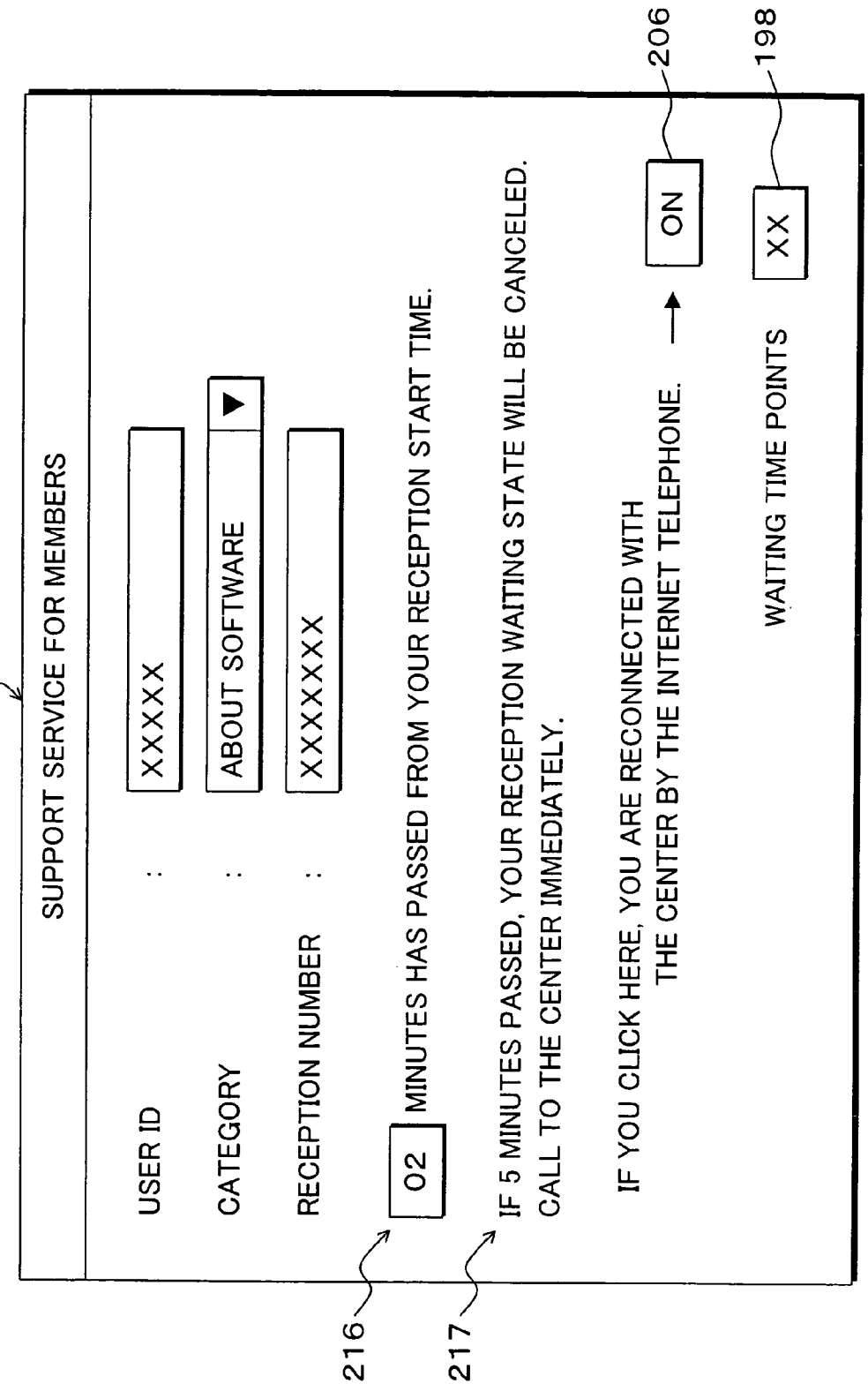
FIG. 36 is an explanatory diagram of a reconnection stand-by screen in the case that a support start time has been passed in the server of FIG. 18.

FIG. 30 is an application for support screen 180 in the client 32-2 which uses the IP telephone, and the user can execute the application for support by entering the user ID in a user ID input field 182, selecting the category that the user inquires from a category selection dialogue 184 and clicking a member button 186. To this application for support, a reception number is notified from the telephone coordination server 12, and the screen is changed to a call selection screen 190 of FIG. 31. On the call selection screen 190, since the user uses the IP telephone 36, an IP telephone selection button 192 is clicked. In this way, the VoIP process unit 44 of the client 36-2 establishes a communication path by accessing to the telephone coordination server 12 via the internet 38 and automatically sends the reception number notified from the server 12. Therefore, the telephone coordination server 12 registers and allocates the reception number sent through the call connection by the IP telephone 36 into the queue 54 and notifies the wait time and the wait time points to display a stand-by screen 194 of FIG. 32. On this stand-by screen 194, a wait time display field 195 is displayed, and for example, "06" minutes are displayed as the wait time. If the wait time notified on the stand-by screen 194 is long, the user hangs up the telephone 36 once. When the IP telephone 36 is hanged up in this way, the screen is changed to a reconnection stand-by screen 200 of FIG. 33. In a wait time display field 195 of this reconnection stand-by screen 200, the current wait time, for example, "06" minutes are displayed, and the wait time point which is increased as the wait time elapses is displayed in a point display field 198. At this point, if the user wants to hang up the IP telephone once because the wait time is long, the user clicks a telephone disconnection button 196. By clicking this telephone disconnection button 196, the communication path of the IP telephone 36 via the internet 38 is disconnected, and the screen is changed to a reconnection stand-by screen 200 of FIG. 33. On this reconnection stand-by screen 200, a message indicating that the call connection with the support center is disconnected is displayed, and the wait time and the wait time points are updated and displayed. When the remaining time for start of support becomes one (1) minute in the telephone coordination server of the support center 10, a reconnection stand-by screen 202 as shown in FIG. 34 is displayed. In other words, on the reconnection stand-by screen 202, a message 204 for requesting the user to make a telephone call to the support center 10 again is displayed because the remaining time of the wait time is less than one (1) minute. Also, a call connection button 206 for the call connection by the IP telephone 36 is displayed under it, and by clicking this, the reconnection with the support center 10 is performed by the IP telephone 36. When the reconnection of the IP telephone 36 is performed, a support start screen 208 is displayed in response to the supporter confirmation notification from the telephone coordination server 12 at the time of start of support. This support start screen 208 has a person-in-charge-of-support selection list 210, and when the user selects a supporter considered to be appropriate for the inquiry by clicking any of selection buttons 212-1 to 212-3, the call connection with the selected supporter is performed, and it will be possible to inquire to the supporter through the IP telephone 36. On the other hand, on the display of the reconnection stand-by screen 202 of FIG. 34, if the call connection button 206 is not clicked because the user leaves the seat for example, the screen is changed to the reconnection stand-by screen 215 of FIG. 36 when the call start time has been passed. On this reconnection stand-by screen 215, a message 216 indicating the elapsed time from the reception start time and a warning message 217 which tells that the cancellation is performed if the elapsed time becomes more then five (5) minutes. Therefore, if the user clicks the call connection button 206 before five (5) minutes elapse from the reception time, a support start screen 208 of FIG. 35 is displayed, and by selecting a supporter, it is possible to establish a call connection and consult, but if five (5) minutes elapses, a cancellation process is executed in the telephone coordination server 12, wherein the reception number is removed from the queue, and the screen is changed to a cancellation notification screen 218 of FIG. 37. On this cancellation notification screen 218, a cancel message 219 is displayed because a telephone call is not made before five (5) minutes has passed from the reception start time, and if the inquiry is wanted again, the user has to back to the application for support screen 180 of FIG. 30 by clicking a return button 220 and repeats from the start.

In addition, in the embodiment in which the telephone call can be hanged up once after the application for support is performed according to the telephone server 12 of FIG. 18, even if the wait time is thirty minuets or one (1) hour, it is possible to hang up the phone after application and wait during the wait time.

If the wait time is long in this way, the wait time points to the client side are not counted up during the telephone connection is disconnected. In other words, the wait time points are counted up according to the passage of the wait time only when the user waits for start of support in the state that the telephone call is actually connected.

Also, in the above embodiments, a cabled telephone using a public telephone line is taken as an example of the standard phone, it may be a cell phone using a wireless line, of course.

Further, process screens on the client side for the application for support, the support start wait state, selecting a person-in-charge-of-support at the time of start of support and others in the above embodiments may be appropriate display contents according to need, and as long as the remaining time and order for start of support can be understood and the wait time points are displayed in real time at least on the stand-by screen for start of support, any form of display screen may be utilized.

Further, for the wait time displayed on the stand-by screen, since an accurate wait time is usually difficult to predict, a time calculated by multiplying an inquiry time per a user in the support center obtained statistically by an order in the queue 54 will be notified and displayed on the user side as a target.

The present invention includes any alterations without impairing the object and benefit thereof and is not limited by the numerical values indicated in the above embodiments.

What is claimed is:

1. A telephone support method comprising:
   a support reception step issuing a reception number in response to an application for support from a user terminal and notifying the user terminal of the reception number and a guidance for a call connection;
   a wait state management step notifying the user terminal of wait information indicating a current wait state and of wait time points increased as a wait time elapses until a support terminal becomes available for response;
   a support start step connecting to an extension a call connection held at the support terminal when the support terminal becomes available for response; and
   a support end step adding the wait time points to past wait time points and storing the sum.

2. The telephone support method according to claim 1, wherein
   the support reception step includes, if the user is a registered member based on the application for support, issuing a reception number and notifying the user terminal of the reception number and the guidance for call connection, and, if the user is not a registered member, notifying the user terminal of a guide to admission.

3. The telephone support method according to claim 1, wherein
   the support reception step includes notifying, as the guidance for the call connection, the user terminal of a telephone number for the standard telephone and an IP address for an IP telephone of a support site.

4. The telephone support method according to claim 1, wherein
   the wait state management step includes notifying the user terminal of a current wait order or of wait time that remains before the start of support.

5. The telephone support method according to claim 1, wherein
   the support start step includes, when the support terminal becomes available for response, sending selection information on a plurality of support terminals to the user terminal and connecting to an extension the call connection held at a support site specified by a selection response from the user terminal.

6. The telephone support method according to claim 5, wherein
   the support start step includes, when the support terminal becomes available for response, sending to the user terminal, for selection, selection information including names, years of experience and comments of supporters at a plurality of support terminals.

7. The telephone support method according to claim 1, further comprising;
   a reconnection management step, when the call connection with the user terminal held in a wait state is disconnected, continuing to notify the user terminal, for display, of wait information indicating the current wait state and wait time points increased as the wait time elapses, and requesting the user terminal to make a call reconnection at the timing immediately before start of support.

8. The telephone support method according to claim 7, wherein
   the reconnection management step includes, when a call reconnection by telephone is not yet made at the support start time after requesting the user terminal to make the call reconnection, canceling the wait state when the elapsed time from the support start time exceeds a predefined time period.

9. The telephone support method according to claim 7, wherein
   the support reception step includes:
   verifying whether the user is a registered member or not by searching a member database with user information from the application for support; and
   if the user is a registered member, issuing a reception number and notifying the user of the reception number and a guidance for a call connection, and, if the user is not a registered member, notifying the user of a guide to admission.

10. The telephone support method according to claim 7, wherein
    the support reception step includes notifying, as the guidance for the call connection, the user terminal of a telephone number for the standard telephone and an IP address for an IP telephone of a support site.

11. The telephone support method according to claim 7, wherein
    the wait state management step includes notifying the user terminal of a current wait order or of a wait time that remains before the start of support.

12. The telephone support method according to claim 7, wherein
    the support start step includes, when the support terminal becomes available for response, sending selection information on a plurality of support terminals to the user terminal and connecting to an extension the call connection held at a support site specified by a selection response from the user terminal.

13. The telephone support method according to claim 12, wherein
    the support start step includes, when the support terminal becomes available for response, sending to the user terminal, for selection, selection information including names, years of experience and comments of supporters at a plurality of support terminals.

14. A computer-readable storage medium which store a program allowing a computer to execute:
    a support reception step issuing a reception number in response to an application for support from a user terminal and notifying the user terminal of the reception number and a guidance for a call connection;
    a wait state management step notifying the user terminal of wait information indicating a current wait state and of wait time points increased as a wait time elapses until a support terminal becomes available for response;

a support start step connecting to an extension a call connection held at the support terminal when the support terminal becomes available for response; and a support end step adding the wait time points to past wait time points and storing the sum.

15. The storage medium according to claim 14, further comprising;

a reconnection management step, when the call connection with the user terminal held in a wait state is disconnected, continuing to notify the user terminal, for display, of wait information indicating the current wait state and wait time points increased as the wait time elapses, and requesting the user terminal to make a call reconnection at the timing immediately before start of support.

16. The storage medium according to claim 15, wherein the reconnection management step includes, when a call reconnection by telephone is not yet made at the support start time after requesting the user terminal to make the call reconnection, canceling the wait state when the elapsed time from the support start time exceeds a predefined time period.

17. A telephone support apparatus comprising:

a support reception unit issuing a reception number in response to an application for support from a user terminal and notifying, the user terminal of the reception number and a guidance for a call connection;

a wait state management unit notifying the user terminal of wait information indicating a current wait state and of wait time points increased as a wait time elapses until a support terminal becomes available for response;

a support start unit connecting to an extension a call connection held at the support terminal when the support terminal becomes available for response; and a support end unit adding the wait time points to past wait time points and storing the sum.

18. The telephone support apparatus according to claim 17, further comprising;

a reconnection management unit, when the call connection with the user terminal held in a wait state is disconnected, continuing to notify the user terminal, for display, of wait information indicating the current wait state and wait time points increased as the wait time elapses, and requesting the user terminal to make a call reconnection at the timing immediately before start of support.

19. The telephone support apparatus according to claim 18, wherein the reconnection management unit, when a call reconnection by telephone is not yet made at the support start time after requesting the user terminal to make the call reconnection, cancels the wait state when the elapsed time from the support start time exceeds a predefined time period.

* * * * *

UNITED STATES PATENT AND TRADEMARK OFFICE
CERTIFICATE OF CORRECTION

| | |
|---|---|
| PATENT NO. | : 6,999,578 B2 |
| APPLICATION NO. | : 10/786141 |
| DATED | : February 14, 2006 |
| INVENTOR(S) | : Shigeru Hidesawa et al. |

It is certified that error appears in the above-identified patent and that said Letters Patent is hereby corrected as shown below:

Column 21, Line 29, after "notifying" delete ",".

Signed and Sealed this

Twenty-first Day of November, 2006

JON W. DUDAS
*Director of the United States Patent and Trademark Office*